US010313522B2

(12) United States Patent
Batlle

(10) Patent No.: US 10,313,522 B2
(45) Date of Patent: Jun. 4, 2019

(54) PREDICTIVE CROSS-PLATFORM SYSTEM

(71) Applicant: PAYPAL, INC., San Jose, CA (US)

(72) Inventor: Eddie Batlle, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 366 days.

(21) Appl. No.: 15/196,987

(22) Filed: Jun. 29, 2016

(65) Prior Publication Data

US 2018/0007202 A1 Jan. 4, 2018

(51) Int. Cl.
*H04M 3/00* (2006.01)
*H04M 3/51* (2006.01)
*G06Q 30/00* (2012.01)

(52) U.S. Cl.
CPC ........ *H04M 3/5183* (2013.01); *G06Q 30/016* (2013.01); *H04M 3/5166* (2013.01)

(58) Field of Classification Search
CPC .. H04M 3/5175; H04M 3/523; H04M 3/5191; H04M 3/5183; H04M 3/5166; H04M 3/5232; H04M 3/51; H04M 3/5233; H04M 3/5235
USPC ............ 379/265.01–265.02, 265.09, 265.13
See application file for complete search history.

(56) References Cited

U.S. PATENT DOCUMENTS

| | | | |
|---|---|---|---|
| 9,699,315 B2 | 7/2017 | Waalkes et al. | |
| 9,699,774 B2 | 7/2017 | He | |
| 2006/0062376 A1 | 3/2006 | Pickford | |
| 2014/0143018 A1 | 5/2014 | Nies et al. | |
| 2015/0128058 A1 | 5/2015 | Anajwala | |
| 2016/0035039 A1 | 2/2016 | Singh et al. | |
| 2016/0071126 A1 | 3/2016 | Chang et al. | |
| 2016/0078456 A1 | 3/2016 | Chakraborty et al. | |
| 2016/0239848 A1 | 8/2016 | Chang et al. | |

*Primary Examiner* — Rasha S Al Aubaidi
(74) *Attorney, Agent, or Firm* — Haynes and Boone, LLP

(57) ABSTRACT

Systems and methods for predictive cross-platform customer service include receiving first data about a service provider system that includes a plurality of customer service platforms. First user interaction rules are determined based on the first data received. A first condition is then determined to exist in the service provider system based on the first data and the first user interaction rules. First instructions for the service provider system are then determined based on the first condition to achieve a customized user response. The first instructions are provided for the service provider system such that the plurality of customer service platforms has access to the first instructions. Second data of a user interaction with at least one customer service platform is received when the first instructions have been executed. The first instructions are updated to second instructions based on the second data received.

20 Claims, 18 Drawing Sheets

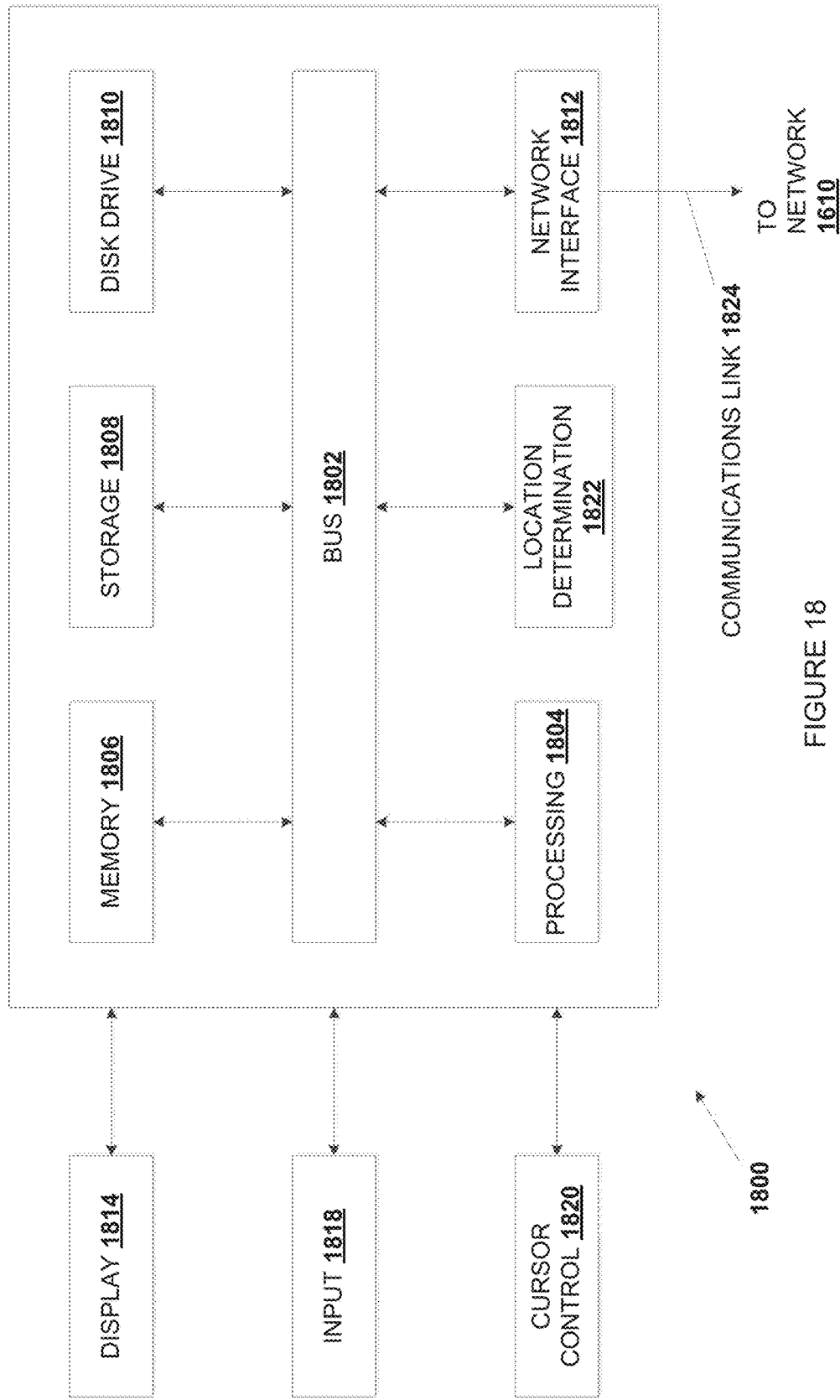

PREDICTIVE CROSS-PLATFORM SYSTEM

CROSS REFERENCE TO RELATED APPLICATIONS

This application is related to U.S. Utility application Ser. No. 15/197,150, filed Jun. 29, 2016, the disclosure of which is incorporated herein by reference in its entirety.

BACKGROUND

Field of the Disclosure

The present disclosure generally relates to electronic prediction and more particularly to a cross-platform prediction system that may be used to provide customize electronic content.

Related Art

More and more consumers are conducting transactions over electronic networks such as, for example, the Internet. Consumers routinely provide various information through the electronic networks as part of the transaction. The transactions, such as a purchase transaction, may take place directly between a conventional or on-line merchant or retailer and the consumer, and payment is typically made by entering credit card or other financial information. Transactions may also take place with the aid of an on-line or payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Business entities such as payment service providers, merchants, retailers, and other service providers typically employ a customer service system where customers may inquire or receive support to questions or issues that customers may be experiencing in relation to a product, a service, or a system of a business entity with which the customer is interacting. Customer service systems may include several support platforms including contact centers where a customer may interact with a customer service representative, interactive voice response systems (IVR), and/or a customer service website. However, contact centers employing customer service representatives are expensive to provide, and may become overwhelmed with customer interactions for certain events or times of day, resulting in a lessened customer experience in resolving the customer's issue due to wait times. Websites that include answers to frequently asked questions (FAQ) and IVR systems may be used help reduce the number interactions with a contact center (and, in turn, the cost of providing that contact center) by providing automated systems that can access solutions to predefined issues or questions that a customer may have. However, FAQ and IVR systems are generally static and do not take into account current conditions of the business entity's systems, are limited to the number of issues or questions that they may resolve before they become cumbersome to the customer, and do not take into account what the customer has already done to resolve a question or issue, which may lead to escalated customer frustration before ultimately calling a contact center.

Thus, there is a need for an improved customer service system.

BRIEF DESCRIPTION OF THE FIGURES

FIG. 18 is a schematic view illustrating an embodiment of a computer system.

Figure 1:
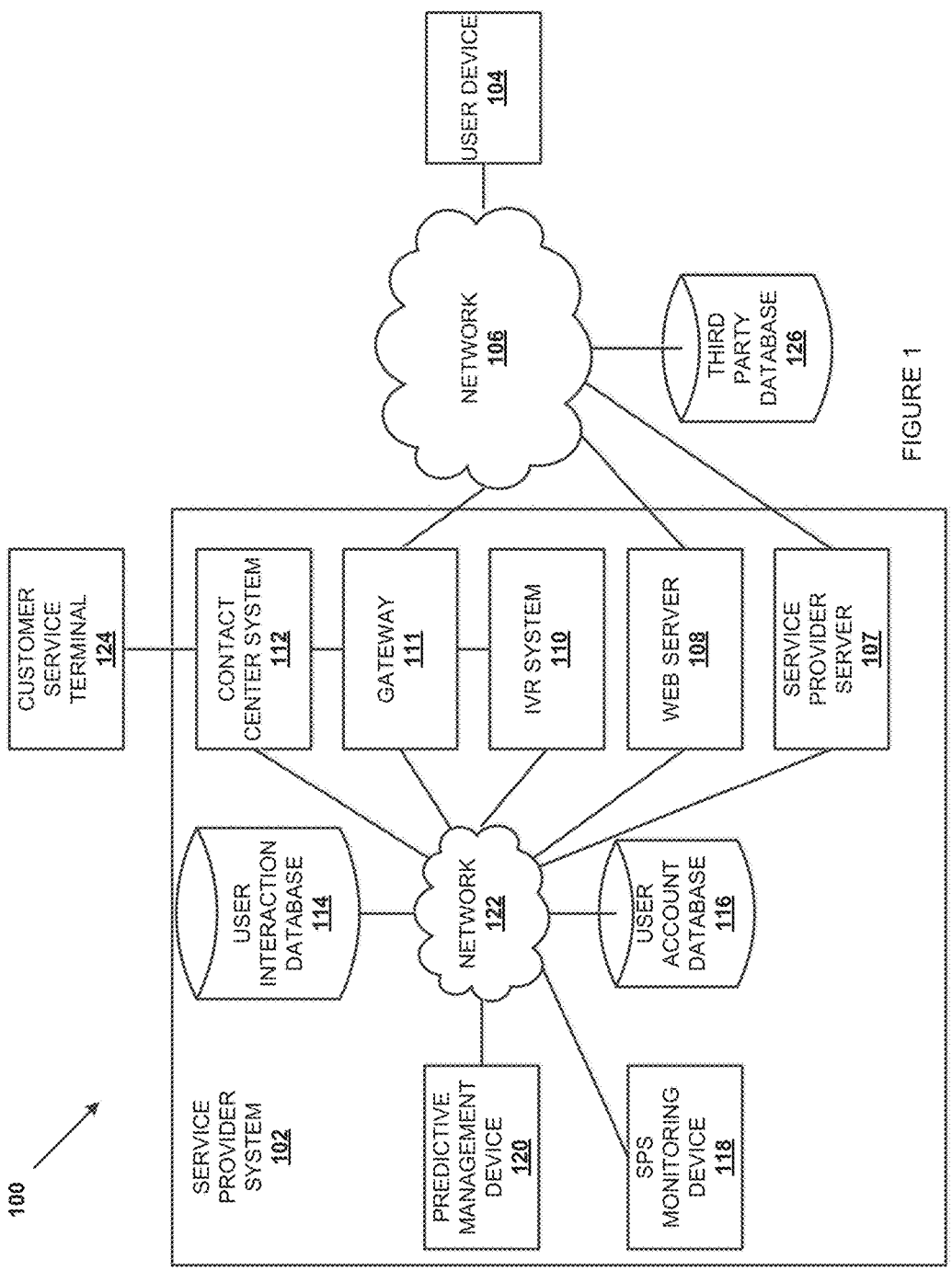
FIG. 1 is a schematic view illustrating an embodiment of a service provider system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for predictive cross-platform customer service that operates to provide a customized user experience to a user (e.g., customer) of a service provider system. The service provider system may include a predictive management device that may perform many of the functions of the predictive cross-platform customer service system. The predictive management device may have access to a database of historical data such as data related to historical conditions of the service provider system, data related to historical interactions that user(s) have previously performed with the service provider system, data related to user accounts, third party databases and services, and/or other data stores that allow for the functionality described herein. The predictive management device may also receive real-time data about present conditions of the service provider system and current interactions of users interacting with the service provider system. For example, a network management device may monitor the service provider system and generate information relating to the conditions of the systems and network of the service provider system (e.g., server speed, latency on the network, application performance, and other relative information about the network and/or components of the service provider system that may affect a user's experience with the service provider system) that is then provided to the predictive management device. In another example, a web server of the service provider system may generate real-time data regarding users of the service provider's website (e.g., user account information, specific web pages visited by the user, searches performed by the user, and other user interaction data related to interactions that a user may perform at a service provider website, along with any metadata associated with those interactions). In another example, an interactive voice response (IVR) system may generate user interaction data of users interacting with the IVR system. In yet another example, a contact center server may generate interaction data in response to users interacting with customer service representatives such as, for example, inputs provided by customer service representatives while interacting with particular users.

The predictive management device may include one or more machine learning algorithms that may generate and provide instructions to a customer interaction database based on the historical data, real-time data, and/or any other data generated by the system and received by the predictive management device. The instructions may be accessible by the various customer service platforms of the service provider system (e.g., a web server, IVR system, a contact center server) and may cause the customer service platforms to present information to a user based on the historical, real-time, and other data to achieve a customized user experience. For example, a customized user experience may include resolving a question or issue of a user without the user establishing a communication session with a customer service representative. The predictive management device may determine, based on the historical, real-time, and other data, conditions on the service provider system, which may include conditions of a user account of the user, that indicate a threshold probability that the user will establish a communication session with a customer service representative. The predictive management device may then provide instructions for providing the customized used experience to a user interaction database that is accessible by the different customer service platforms provided to achieve the customized user experience. The predictive management device may receive subsequent real-time data from the various customer service platforms as the customer service platforms execute the instructions to provide the customized user experience, which may include user interaction data. The feedback of the user interaction data may be used by the predictive management device to update the instructions to provide the customized user experience and/or rules for generating the instructions to provide the customized user experience. The updated instructions may be transmitted directly to the particular customer service platform and/or may update the instructions stored in the user interaction databases. The updated instructions may include instructions for other customer service platforms besides the customer service platform the user is interacting with. Because the predictive management device is receiving information about a user in real-time from one customer service platform, the predictive management device may be configured to provide updated instructions to the user interaction database, which may include information regarding the user's last interaction with a customer service platform that is now accessible to another.

Thus, a cross-platform customer service system is achieved, at least in part, by enabling each of the customer service platforms to access the instructions to provide the customized user experience and the information regarding the user's last interaction with a previously accessed customer service platform. Having information and instructions available across customer service platforms saves time in having to repeatedly gather data from the user and may alleviate frustrations of the user in having to provide information multiple times when resolving a problem. Such customized user experiences may lead to better retention of customers and more efficient use of customer service system resources to reduce costs of the service provider.

Referring now to FIG. 1, an embodiment of a cross-platform customer service system 100 is illustrated. The cross-platform customer service system 100 includes a service provider system 102 and a user device 104 in communication over a network 106. Although only one user device 104 is illustrated as being in communication with the service provider system 102, a plurality of user devices 104 may be in communication with the service provider system 102 over the network 106 while remaining within the scope of the present disclosure. In an embodiment, the user device 104 may be provided by a desktop computing system, a laptop/notebook computing system, a tablet computing system, a mobile phone, a landline phone, a wearable computing device and/or other user devices known in the art. The network 106 may be implemented as a single network or a combination of multiple networks. For example, in various embodiments, the network 106 may include the Internet and/or one or more intranets, landline networks, wireless networks, and/or other appropriate types of networks. The network 106 may include a data network, a public switched telephone network, and/or a converged network on which both data communications and voice communications are transmitted.

The service provider system 102 may include a service provider server 107 that may include multiple servers and devices for providing a service to a user through the user device 104. For example, the service provider system 102 may provide payment services for facilitating online and/or mobile payments between a retailer/merchant and a consumer. In other examples, the service provider system 102 may be an online retailer system configured to present and sell products to a consumer, a gaming system that provides online gaming to a consumer, a content provider system that provides content such as streaming videos to a consumer, a general consumer support system for an organization, a banking system, and other systems belonging to organizations that require customer support. The service provider server 107 may include multiple servers and systems for providing the services and/or products related to the service provider's business. The service provider system 102 may also include a consumer service system that includes a plurality of customer service platforms such as a web server 108, an interactive voice response (IVR) system 110, and a contact center system 112. In addition, the service provider system 102 may include one or more databases such as a user interaction database 114 and a user account database 116. Furthermore, the service provider system 102 may include a plurality of networking devices such as a gateway 111, a service provider system (SPS) monitoring device 118, and a predictive management device 120. However, other customer service platforms providing other customer service actions and including other devices and subsystems are envisioned as falling within the scope of the present disclosure. As can be seen in the illustrated embodiment, the various devices, servers, and databases of the service provider system 102 may be in communication with each other over a network 122. However, each of the components may communicate with each other over the network 106 and/or other communication connections that are envisioned as falling within the scope of the present disclosure as well.

The cross-platform customer service system 100 also includes a customer service terminal 124 from which a customer service representative may help to provide customer service. The customer service terminal may include a telephone for voice communications and/or a computing device for receiving information related to a communication session and displaying information, videos, etc. to a customer service representative. As can be seen in the illustrated embodiment, the customer service terminal 124 is in direct communication with the contact center system 112 and is not included in the service provider system 102. However, it is contemplated that the customer service terminal 124 may be in communication with any of the components of the service provider system 102 through the network 106 and/or the network 122, included in the service provider system 102, and provided via other configurations that are envisioned as falling within the scope of the present disclosure. Furthermore, the cross-platform customer service system includes a third party database 126 that may be in communication with the service provider system 102 through network 106. However, the third party database may be in communication with the service provider system 102 through network 122 as well. The third party database 126 may provide third party data such as social media data, $3^{rd}$ party service provider disruptions, credit bureau data, federal compliance and regulatory data, and other third party data for providing customer service that would be apparent to one of skill in the art in possession of the present disclosure.

As discussed in further detail below, each of the web server 108, the IVR system 110, the contact center system 112, and the SPS monitoring device 118 are configured to collect data, and then provide that data to the predictive management device 120. Furthermore, the service provider server 107 may collect data related to the services provided to customers and interactions customers have with the service provider server 107 and provide the data to the predictive management device 120. The data collected from the various sources may be used by the predictive management device 120 to generate customer service rules and customer service instructions that are stored at the user interaction database 114. The web server 108, the IVR system 110, and the contact center system 112 may then retrieve and execute the customer service instructions from the user interaction database to provide the customized customer experiences to a user of the user device 104 as described below.

Figure 2:
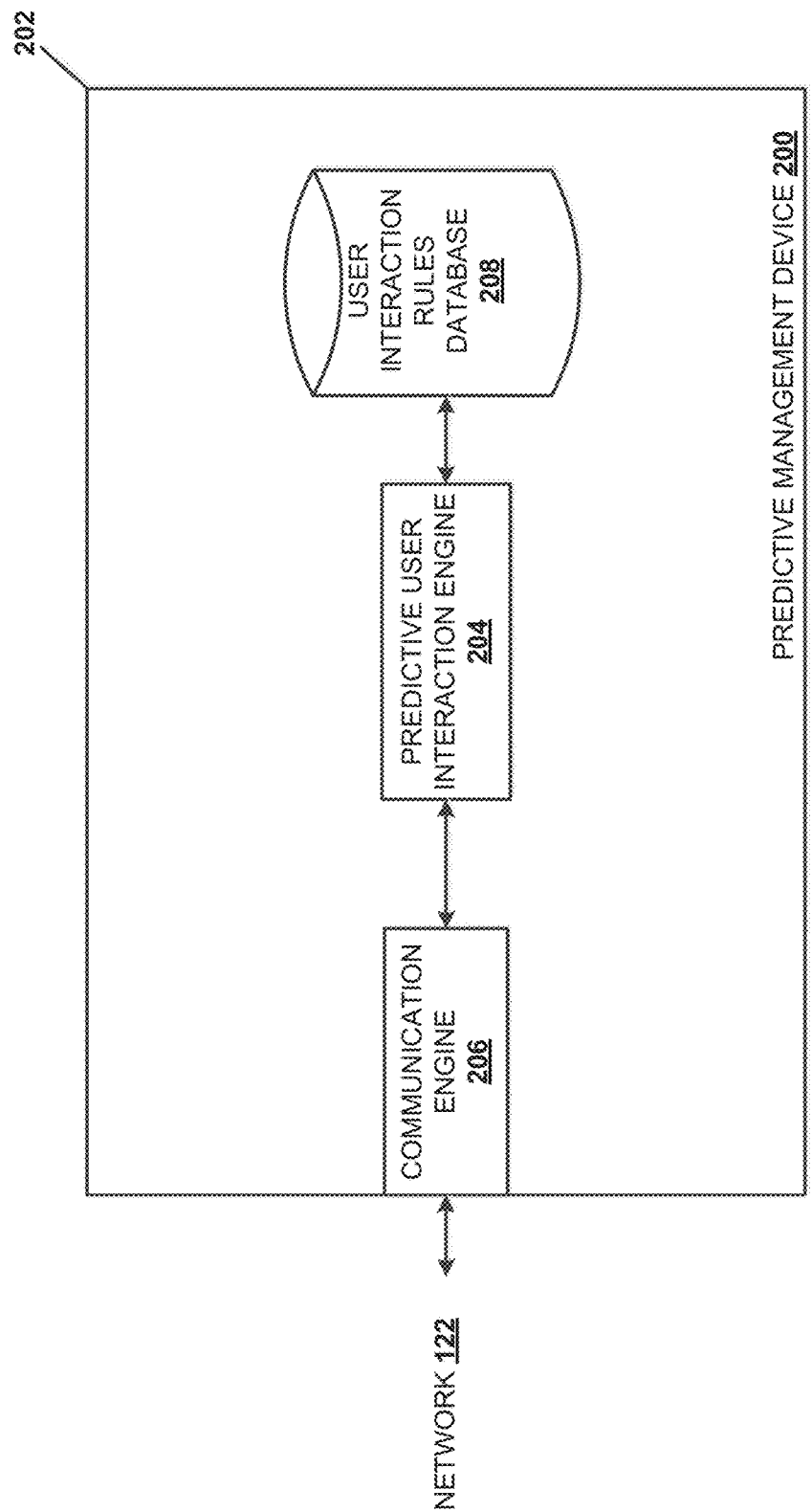
FIG. 2 is a schematic view illustrating an embodiment of a predictive management device of the service provider system of FIG. 1.

Referring now to FIG. 2, an embodiment of a predictive management device 200 is illustrated. In an embodiment, the predictive management device 200 may be the predictive management device 120 discussed above. In the illustrated embodiment, the predictive management device 200 includes a chassis 202 that houses the components of the predictive management device 200, only some of which are illustrated in FIG. 2. For example, the chassis 202 may house a processing system (not illustrated) and a non-transitory memory system (not illustrated) that includes instructions that, when executed by the processing system, cause the processing system to provide a predictive user interaction engine 204 that is configured to perform the functions of the predictive user interaction engine 204 and/or the predictive management device 200 discussed below. In a specific example, the predictive user interaction engine 204 may be software or instructions stored on a computer-readable medium that is configured to receive historical, real-time, and other data from the service provider system 102 of FIG. 1, generate user interaction rules based on the historical, real-time, and other data, monitor for conditions on the service provider system 102 based on the user interaction rules, provide instructions to customer service platforms to provide customized user experiences, provide cross customer service platform interactions, and provide any of the other functionality that is discussed below.

The chassis 202 may further house a communication engine 206 that is coupled to the predictive user interaction engine 204 (e.g., via a coupling between the communication system 206 and the processing system) and configured to provide for communication through the network 122 as detailed below. The communication engine 206 may be software or instructions stored on a computer-readable medium that allows the predictive management device 200 to send and receive information over the network 122. The chassis 202 may also house a user interaction rules database 208 that is coupled to the predictive user interaction engine 204 through the processing system. The user interaction rules database 208 may store static and dynamic rules used by the predictive customer interaction engine 204 to determine conditions on the service provider system 102 and/or to generate instructions to provide to the customer service systems of the service provider system 102 based on the determined conditions. While the user interaction rules database 206 has been illustrated as housed in the chassis 202 of the predictive management device 200, one of skill in the art will recognize that it may be connected to the predictive user interaction engine 204 through the network 122 without departing from the scope of the present disclosure.

Figure 3:
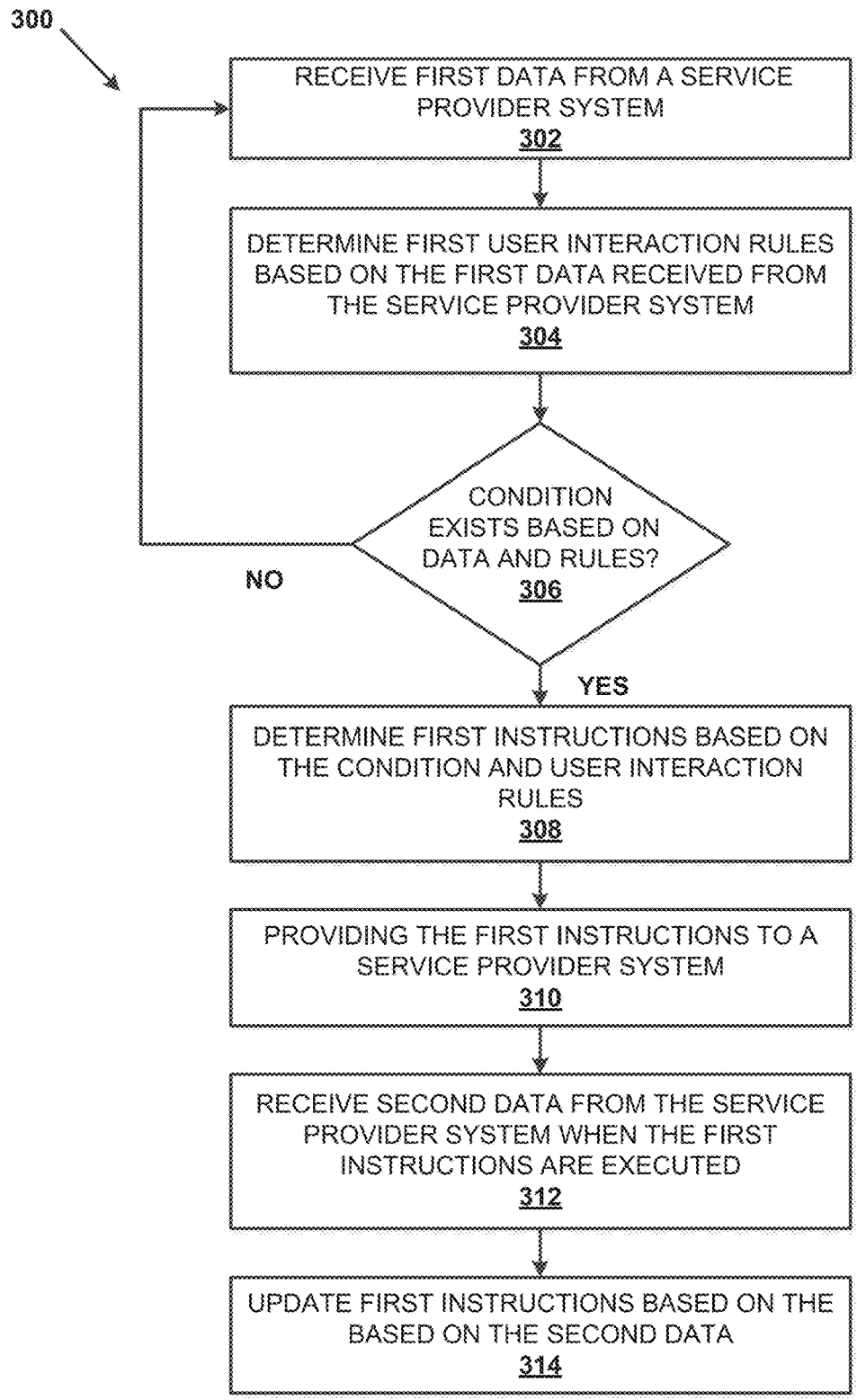
FIG. 3 is a flow chart illustrating an embodiment of a method of providing a cross-platform customer service system.

Referring now to FIG. 3, a method 300 for providing a customized user experience across customer service platforms is illustrated. In some embodiments of the method 300, the predictive management device 200 may be configured to perform or enable the method 300. The method begins at block 302 where first data is received from a service provider system. In an embodiment, the predictive management device 200 receives data from the service provider system 102 of FIG. 1. In some embodiments, the predictive management device 200 monitors the service provider system 102, which may include receiving real-time data in addition to historical data from various components of the service provider system 102, (e.g., data from the user account database 116, data from the SPS monitoring device 118, data from the web server 108, data from the IVR system 110, and data from the contact center system 112), data from the third party database 126, and/or data from any other data sources that one of skill in the art in possession of the present disclosure would recognize would allow the predictive management device 200 to provide the customized user experiences in the cross-platform customer service system as described below.

The method 300 may then proceed to block 304 where the predictive management device determines first user interaction rules based on the first data received from the service provider system. In an embodiment, at block 304 the predictive user interaction engine 204 of the predictive management device 200 may include one or more machine learning algorithms such as frequent pattern growth heuristics, other unsupervised learning algorithms, supervised learning algorithms, semi-supervised learning algorithms, reinforcement learning algorithms, deep learning algorithms, and other machine learning algorithms known in the art. The predictive user interaction engine 204 may be configured to generate the first user interaction rules based on the real-time data and historical data received from the service provider system 102 and/or third party database 126. In an embodiment, the user interaction rules are rules that the predictive management device 200 follows to determine a condition for which to monitor on the service provider system 102, and determine instructions based on conditions that exist in the service provider system 102. For example, the condition may be determined to exist from the real-time data and the historical data used by the predictive management device 200 to generate the first user interaction rules. In an embodiment, the predictive user interaction engine 204 may include static rules that describe general goals of the service provider and that are updatable by the service provider. For example, a goal of the service provider may be to maximize profits, reduce the number of communication sessions between a user and a customer service representative, retain users as customers, increase consumption by the certain users, and any other goal, hierarchy of goals, or combination of goals that would be apparent to one of skill in the art in possession of the present disclosure. The predictive management device may consider these goals when generating the rules. The predictive management device 200 may store the rules in the user interaction rules database 208.

In a specific example, when a goal of the service provider is to minimize costs, the predictive management device may determine that customer service representatives are costly and may establish rules to decrease the number of communication sessions between a user and a customer service representative. Fewer communication sessions may reduce costs by reducing the number of customer service representatives needed to service the communication sessions. The predictive management device 200 may analyze the historical data and the real-time data received from the various data sources described above to determine conditions where a user initiated a communication session with a customer service representative. The predictive management device 200 may then generate rules for monitoring data received at the predictive management device 200 to alert the predictive management device 200 when a condition exists on the service provider system 102 that may result in a communication session between a user and a customer service representative.

The method then proceeds to determination block 306 where the predictive management device determines whether a first condition exists on the service provider system based on the first data received and the first user interaction rules. In an embodiment, at block 306 the predictive management device 200 may continue to monitor the service provider system 102 to determine whether a user interaction rule has been satisfied based on the real-time and historical data received from service provider system 102. Continuing the specific example above, a rule identifying possible users that will initiate a communication session with a customer service representative may identify users that do not receive a refund of a returned item within three days as having a higher probability of initiating an interaction with a customer service representative. The predictive management device 200 may then receive data from user accounts as to whether there are any pending refunds, along with the period of time that has passed since the refund went pending. When a user account has a pending refund and the period of time is approaching or at three days, then a condition that is based on those first user interaction rules exists on the service provider system 102. If a first condition does not exist, the method 300 returns to block 302 where the predictive management device 200 receives data from the service provider system 102.

If the first condition does exist at block 306, the method then proceeds to block 308 where the predictive management device determines first instructions to provide to the service provider system based on the first condition. In an embodiment, in response to determining that a condition exists on the service provider system 102, the predictive management device 200 may determine first instructions to provide to the various customer service platforms (e.g., the web server 108, the IVR system 110, and the contact center system 112) of the service provider system 102. In an embodiment, the predictive user interaction engine 204 may include machine learning algorithms that may determine what action or actions to take given the first condition and the first user interaction rules in order to achieve a particular user response based on historical data. The predictive user interaction engine 204 may generate first instructions based on the actions determined by the machine learning algorithms, and those first instructions may be generated for one or more customer service platforms (e.g., instructions for the web server 108, instructions for the IVR system 110, and/or instructions for the contact center system 112).

For example, the predictive management device 200, by use of one or more machine learning algorithms, may determine first conditions in the service provider system 102 that are similar to second conditions that have resulted in a user initiating a communication session with a customer service representative, but which resulted in a customer not initiating an interaction with a customer service representative. More specifically, the predictive management device 200 may determine that a frequently asked question (FAQ) link on the website hosted by the web server 108 was accessed by a group of users with conditions that are the same as, or similar to, users that initiated a communication session with a customer service representative. By following the user interaction rules, the predictive management device 200 may determine instructions for the web server 108 to more prominently display the FAQ link at a web page of the website when a particular user that satisfies the first conditions logs on to their user account through the web server 108 of the service provider system 102. In another example, the contact center system 112 may send an email or text message to the particular user informing them of information that may be found on the FAQ. In another example, the predictive management device 200 may also determine first instructions for the IVR system 110 to provide customers that call in the information from the FAQ link of the website, or provide an option to present the information from the FAQ link to a user that is associated with the first condition when the user initiates contact with the IVR system 110. The predictive management device 200 may also generate first instructions for the contact center system 112 such that if the user does establish a communication session with a customer service representative, the customer service representative will have all of the user's information, possible reasons for the user interacting with the customer service representative, and prior interactions with other customer service platforms (e.g., inquiring about a refund as in the previous specific example). Because the first rule of decreasing the number of user communication sessions with a customer representative was not satisfied, the first instructions may include information for the customer service representative to pass along to the user that may help satisfy the rule in the future such as, for example, pointing to FAQ links on the service provider's website hosted by web server 108 or other information that may prevent the user, based on positive user experiences, from initiating a communication session with a customer service representative.

The method 300 then proceeds to block 310 where the predictive management device provides the first instructions to the service provider system. In an embodiment, predictive management device 200 may provide the first instructions over network 122 to the user interaction database 114 to which each customer service platform (e.g., the web server 108, the IVR system 110, and contact center system 112) has access and from which each customer service system may access, retrieve, receive, and/or read the first instructions. In other embodiments, the predictive management device 200 may transmit the instructions directly to a customer service platform. For example, if a user is interacting with the website of the web server 108, then the predictive management device 200 may transmit the first instructions directly to the web server 108 over network 122. The web server 108, the IVR system 110, and the contact center system 112 may execute the first instruction that may be based on further conditions recognized by each respective customer service system. For example, the web server 108 may detect a condition defined by the first instructions and perform an action based on detecting the condition defined by the first instructions. The execution of the first instructions for each of the web server 108, the IVR system 110, and the contact center system 112 are further described below at method 700 of FIG. 7, method 1100 of FIG. 11, and method 1300 of FIG. 13, respectively.

The method 300 then proceeds to block 312 where the predictive management device receives second data of a user interaction with at least one of the customer service platforms. In an embodiment, the predictive management device 200 may receive second data from the customer service platform that is executing the first instruction (e.g., during the execution of those first instructions, or subsequent to the execution of those first instructions). The second data may include any information regarding the user's interactions with the customer service platform such as, for example, web pages visited, customer satisfaction survey results, responses to questions asked by the customer service system, metadata associated with the user interaction (e.g., type of device, location information, time and duration of interaction, and other relative metadata related to the user interaction), and whether the desired user response was achieved.

Continuing the specific example above to illustrate block 312, a user may access the website hosted by the web server 108. The user may have a pending refund and it has been three days since the refund was initiated. The web server 108 may query the user interaction database 114 to determine whether any first instructions for that particular user exist, and receive the first instructions upon detection of the user. In another example, the web server 108 may have retrieved more general instructions to monitor certain information about users and perform actions based on criteria of user information obtained at the web server 108. In either case, if the user has a pending refund, the first instructions may cause the web server 108 to provide a customized web page that may include the status of the refund on the web page the user is currently viewing and/or a link to FAQ about refunds that may provide an answer to the user's anticipated question about refunds. The web server 108 may then transmit second data to the predictive management device 200 relating to how the user interacted with the website after the user received the customized web page including the status of the refund and/or the link of the FAQ. For example, if the user left the website after the status of the refund was displayed, or the user selected the FAQ link and then left the website shortly thereafter, this data may be reported back to the predictive management device 200 as second data. Similarly, if the user did select other web page links, performed searches, or performed other actions on the website hosted by the web server 108, then the web server 108 may transmit related second data to the predictive management device 200. Furthermore, the predictive management device 200 may receive second data from a contact center system 112 that indicates that the user initiated a communication session with a customer service representative even after viewing the customized web page hosted by the web server 108. The second data may include why the user initiated a communication session with the customer service representative (e.g., because of the refund or other reasons.) The predictive management device 200 may use this second data to further evaluate the user interaction rules and/or first instructions provided to the customer service platforms.

The method 300 then proceeds to block 314 where the predictive management device updates the first instructions to second instructions based on the second data received as a result of the user interaction. In an embodiment, if the predictive management device 200 receives second data that indicates that a desired user response was achieved, the predictive management device 200 may update the first user interaction rules to generate the second user interaction rules, which may be reinforced first user interactions rules as determined by the machine learning algorithms of the predictive user interaction engine 204. In an embodiment, where the desired user response was not achieved, the predictive management device 200 may generate second instructions based on the first user interaction rule, based on the second user interaction rule which is an updated version of the first user interaction rule, or based on a third user interaction rule (which may have been hierarchally less significant than the first user interaction rule generated using the first data, and which are hierarchally more significant than the second interaction rule generated using the second data, or which may provide the next highest significance in comparison to the first user interaction rules or a completely new user interaction rule that is generated based on the second data.)

For example, the refund status of the user's refund may have been provided on a customized web page of the website hosted by the web server 108, and the user may have selected different links on the web page not related to the refund. Web server 108 may provide the user interaction data with the customized web page to the predictive management device 200. The predictive management device 200 may determine, based on the user interaction data, that the user also has a pending exchange of goods and may also determine second instructions to provide to the customer service platforms based on the exchange of goods, which may include second instructions provided directly to the web server 108 to update the customized web page to provide information regarding the user's exchange of goods.

Figure 4:
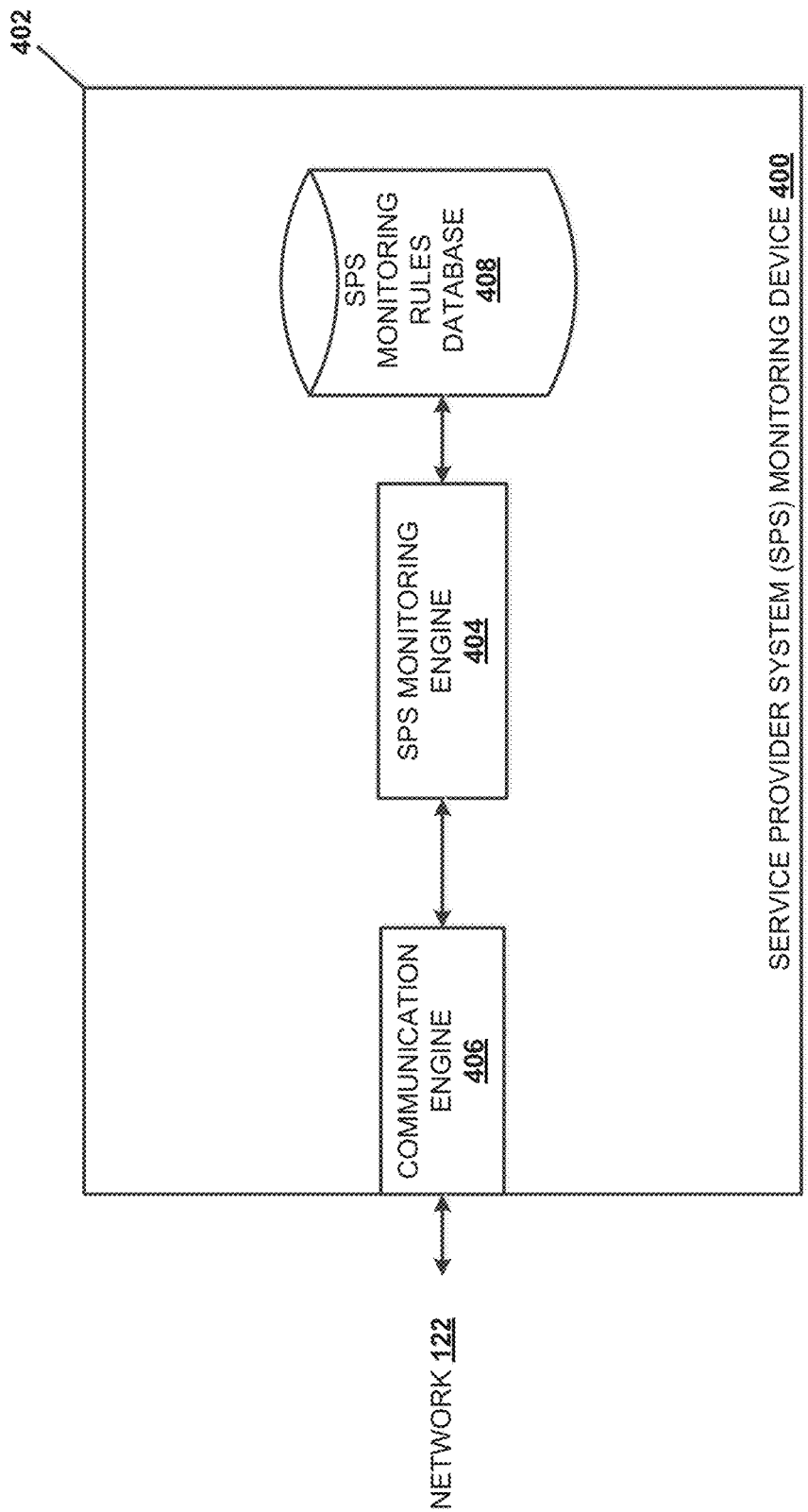
FIG. 4 is a schematic view illustrating an embodiment of a service provider monitoring device of the service provider system of FIG. 1.

Referring now to FIG. 4, an embodiment of a service provider system (SPS) monitoring device 400 is illustrated. In an embodiment, the SPS monitoring device 400 may be the SPS monitoring device 118 discussed above in FIG. 1. In the illustrated embodiment, the SPS monitoring device 400 includes a chassis 402 that houses the components of the SPS monitoring device 400, only some of which are illustrated in FIG. 4. For example, the chassis 402 may house a processing system (not illustrated) and a non-transitory memory system (not illustrated) that includes instructions that, when executed by the processing system, cause the processing system to provide a SPS monitoring engine 404 that is configured to perform the functions of the SPS monitoring engine 404 and/or the SPS monitoring device 400 discussed below. In a specific example, the SPS monitoring engine 404 may be software or instructions stored on a computer-readable medium that is configured to perform tests (e.g., regression tests) and gather data (e.g., server status, application status, network latency, network load, and application layer functionality data) about the components and functionality of the components of the service provider system 102 (e.g., software, hardware, and network functionality) and provide any of the other functionality that is discussed below that one of skill in the art in possession of the present disclosure will recognize as computer functionality that may be enabled by the SPS monitoring engine 404 as well. The chassis 402 may further house a communication engine 406 that is coupled to the SPS monitoring engine 404 (e.g., via a coupling between the communication system 406 and the processing system) and configured to provide for communication through the network 122 as detailed below. The communication engine 406 may be software or instructions stored on a computer-readable medium that allows the SPS management device 400 to send and receive information over the network 122. The chassis 402 may also house an SPS monitoring rules database 408 that is coupled to the SPS monitoring engine 404 through the processing system. The SPS monitoring rules database 408 may store rules used by the SPS monitoring engine 404 to determine conditions of the components of the service provider system 102. While the SPS monitoring rules database 408 has been illustrated as housed in the chassis 402 of the SPS management device 400, one of skill in the art will recognize that it may be connected to the SPS monitoring engine 404 through the network 122 without departing from the scope of the present disclosure.

Figure 5:
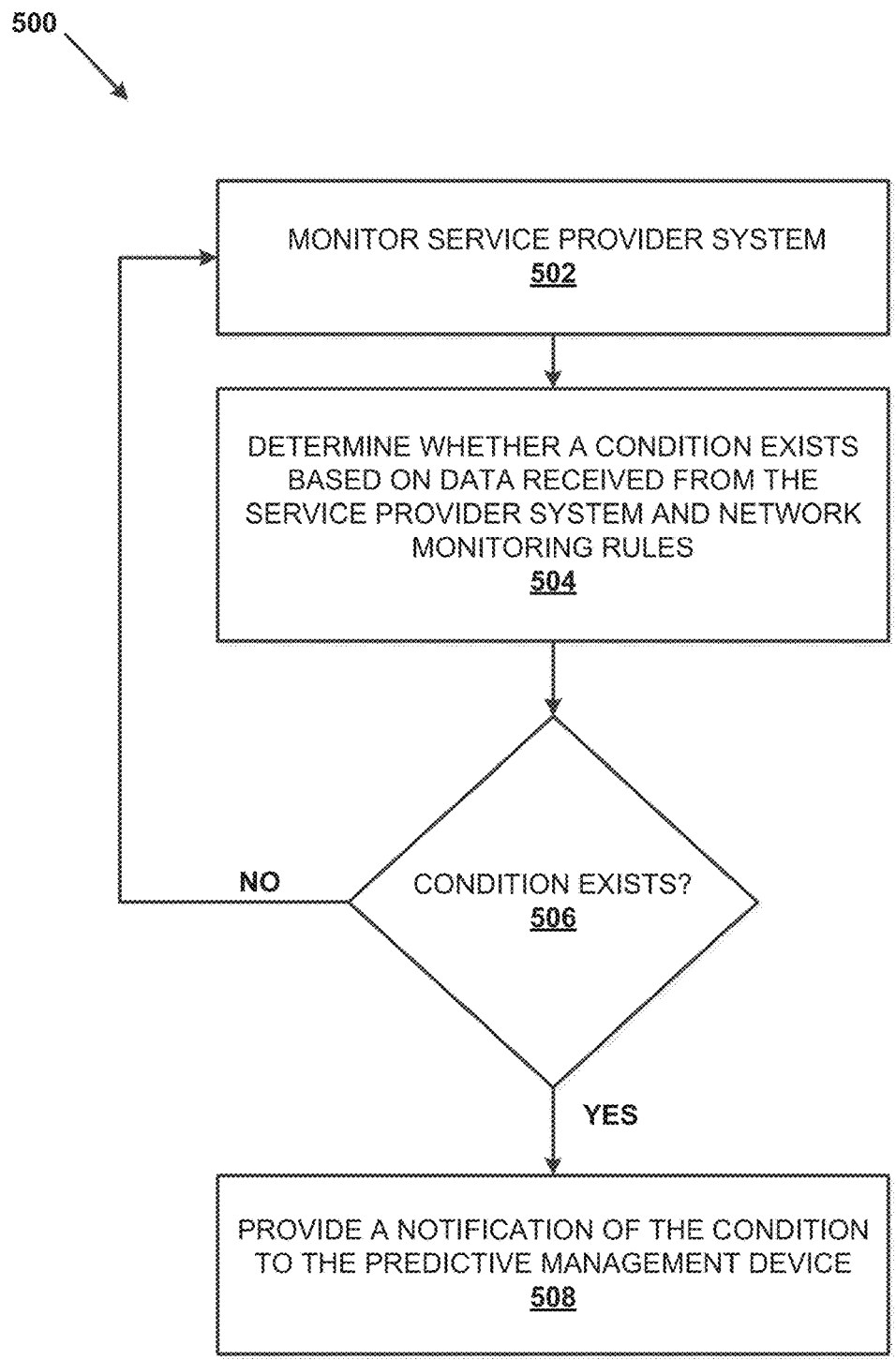
FIG. 5 is a flow chart illustrating an embodiment of a method for providing data associated with conditions on the service provider system to a predictive management device.

Referring now to FIG. 5, a method 500 for providing service provider system data to a predictive management device is illustrated. In some embodiments of the method 500, the SPS monitoring device 400 may be configured to perform or enable the method 500. The method 500 illustrates an embodiment of the first data received by the predictive management engine as described above at block 302 of the method 300 illustrated in FIG. 3. As described above, with respect to block 302, the predictive management device 200 may receive first data that may include data from the SPS monitoring device 400. The data from the SPS monitoring device 400 may be backend data such as performance data relating to the components of the service provider system (e.g., the physical operations of the web servers, networking devices, IVR system, databases, applications, third party API services, and other service provider system infrastructure).

The method 500 begins at block 502 where a SPS monitoring device monitors the components of the service provider system 102. In an embodiment, the SPS monitoring device may receive and/or gather data of the various components of the service provider system 102. The data may be performance data such as component errors, component loads, network latency, response times, transaction rate, network utilization, processing utilization, database utilization, and any other performance data of components of a service provider system 102 including hardware and software that would be apparent to one of skill in the art in possession of the present disclosure.

In an embodiment, the SPS monitoring device 400 may transmit any performance data gathered to the predictive management device 200, and the predictive management device 200 may determine whether any conditions exist based on the performance data, and/or make any correlations via the machine learning algorithms based on the performance data provided by the SPS monitoring device. In other embodiments, the method 500 then proceeds to block 504 where the SPS monitoring device determines whether a condition exists based on the performance data received from the service provider system 102 and based on SPS monitoring rules. The method 500 then proceeds to decision block 506 where the SPS monitoring device 400 continues to monitor the service provider system at block 502 if the condition does not exists, or the method 500 proceeds to block 508 and provides first data such as a notification of the condition to the predictive management device 200.

In an embodiment of block 504, the SPS monitoring engine 404 of the SPS monitoring device 400 may determine, based on the data gathered at block 502 of method 500 and SPS monitoring rules stored in the SPS monitoring rules database 408, whether a condition exists relating to the performance of the components of the service provider system 102. In an embodiment, the SPS monitoring rules may be thresholds on various performance metrics. For example, an SPS monitoring rule may be if the load on a web server gets above a certain threshold, a notification will be transmitted to the predictive management device indicating that a threshold has been met as at block 508. The SPS monitoring rules stored in the SPS monitoring rules database 408 may be implemented by a system administrator and may be static in that they monitor for static thresholds. However, in other embodiments, the SPS monitoring rules may be updated by the predictive management device 200 such that the SPS monitoring rule are dynamic.

For example, the SPS monitoring rules may provide data to the predictive management device 200 if, for example, the response time for a website of a webserver is greater than a first time. The first time may be a threshold where users of the service provider system 102 may begin initiating a communication session with a customer service representative which, continuing with the examples above, would violate one or more user interaction rules of the predictive management device 200 based on goals of customer satisfaction and minimizing costs of the service provider system 102. Transmitting the notification to the predictive management device 200 that the load has reached a threshold may cause the predictive management device 200 to generate instructions to inform the various customer service platforms that a web server is experiencing a high load at this time in an attempt to prevent the user from initiating a communication session with a customer service representative. For example, the predictive management device 200 may generate an instruction for the IVR system 110 to generate an interactive response for a user interacting with the IVR system 110 if the user is experience a slower than normal experience with the service provider's website, and provide a reason and/or solution to resolve the issue of the slower website if the user responds affirmatively to the generated interactive response. Furthermore, the predictive management device 200 may begin to receive data from the contact center system 112 that users are initiating communication sessions with customer service representatives about the speed of the website before the predictive management device 200 receives a notification from the SPS monitoring device 400, which may be an indication that user expectation about speed has changed. Therefore the predictive management device 200 may update the SPS monitoring rules in the SPS monitoring rules database 408 to reflect the change in user expectations.

Figure 6:
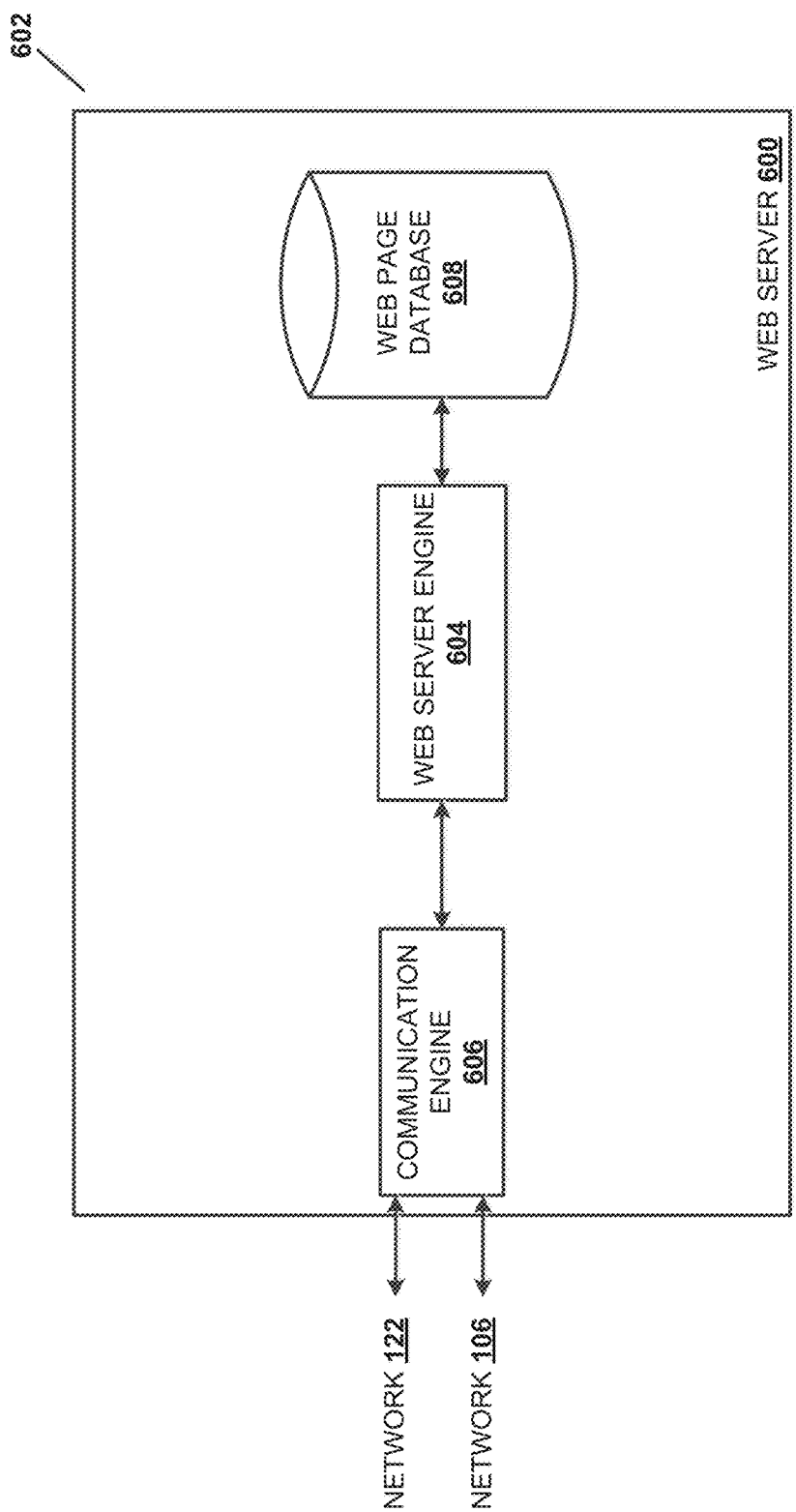
FIG. 6 is a schematic view illustrating an embodiment of a web server of the service provider system of FIG. 1.

Referring now to FIG. 6, an embodiment of a web server 600 is illustrated. In an embodiment, the web server 600 may be the web server 108 discussed above in FIG. 1. In the illustrated embodiment, the web server 600 includes a chassis 602 that houses the components of the web server 600, only some of which are illustrated in FIG. 6. For example, the chassis 602 may house a processing system (not illustrated) and a non-transitory memory system (not illustrated) that includes instructions that, when executed by the processing system, cause the processing system to provide a web server engine 604 that is configured to perform the functions of the web server engine 604 and/or the web server 600 discussed below. In a specific example, the web server engine 604 may be software or instructions stored on a computer-readable medium that is configured to gather frontend data about users interacting with the web server 600 (e.g., web pages visited of the website hosted by the web server 600, data inputted by the user, data regarding the users browser, location of the user, type of user device 104 the user is using to access the web server, click-through rates of links on the website, amount of time a user spends on a web page, survey feedback from the user, and other user related data that a web server may gather known in the art). In a specific example, the web server engine 604 may be software or instructions stored on a computer-readable medium that is configured to generate and provide a customized web page to be displayed on a user device (e.g., user device 104) based on instructions generated by a predictive management device, and provide any of the other functionality that is discussed below.

The chassis 602 may further house a communication engine 606 that is coupled to the web server engine 604 (e.g., via a coupling between the communication system 606 and the processing system) and configured to provide for communication through the network 122 and/or the network 106 as detailed below. The communication engine 606 may be software or instructions stored on a computer-readable medium that allows the web server 600 to send and receive information over the network 122 and/or the network 106. The chassis 602 may also house a web page database 608 that is coupled to the web server engine 604 through the processing system. The web page database 608 may store web pages and or objects of web pages that may be used to generate customized web pages based on instructions generated by the predictive management device 200. While the web page database 608 has been illustrated as housed in the chassis 602 of the web server 600, one of skill in the art will recognize that it may be connected to the web server engine 604 through the network 122 and/or network 106 without departing from the scope of the present disclosure.

Figure 7:
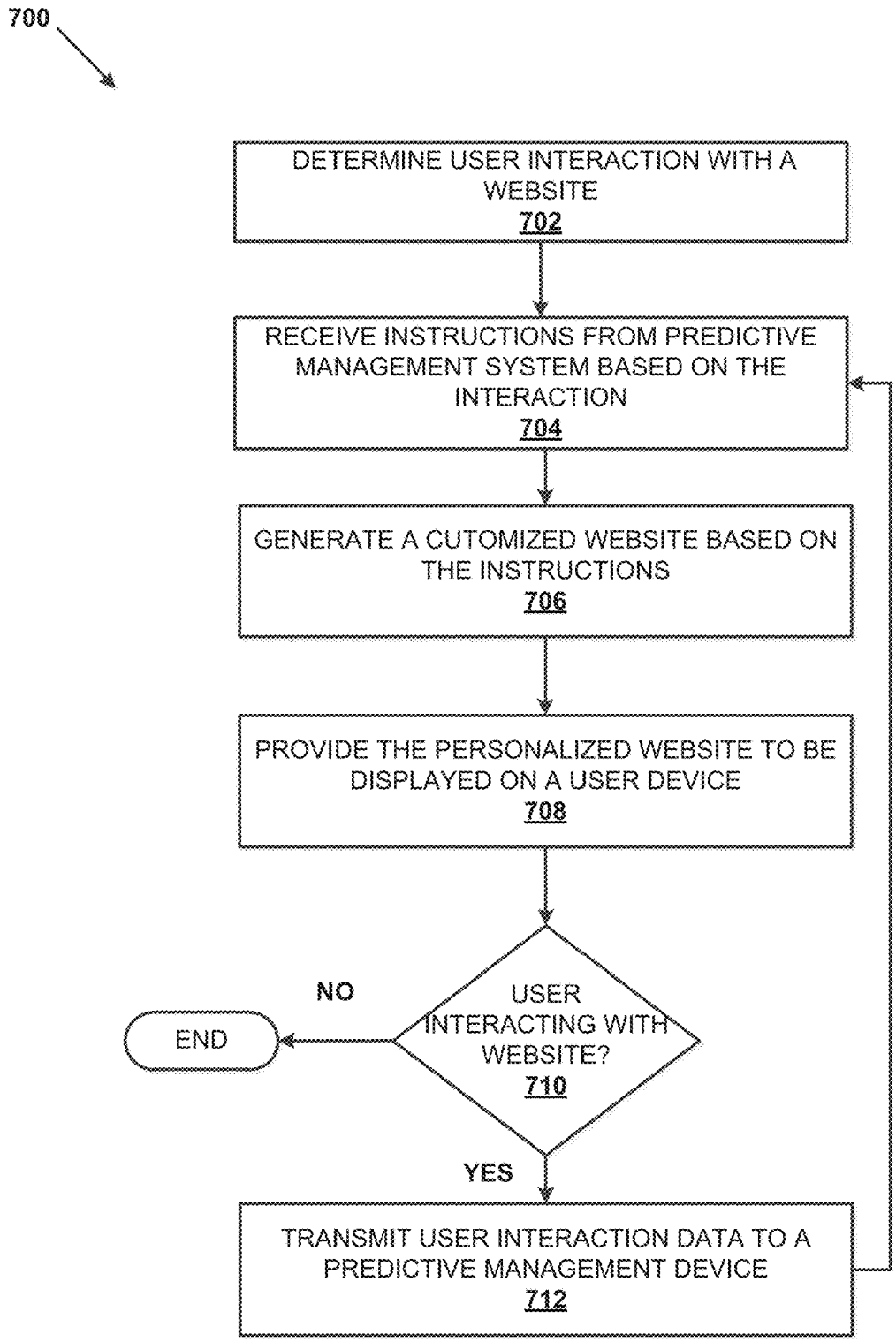
FIG. 7 is a flow chart illustrating an embodiment of a method for providing a customized web page at a user device.

Referring now to FIG. 7, a method 700 for generating a customized user experience via a web server is illustrated. The method 700 begins at block 702 where a web server determines user interaction with a website from a user device. In an embodiment, the web server 600 may detect user interaction with a web page of a website via requests received from the user device 104, and gather any information about the user interaction include user information, location information, user device 104 type, current web page of the website, whether the website was accessed by a mobile application or web browser, time of interaction, Internet protocol address or any other device identifier, authenticated session information, and any other information that may be captured from a user interaction with a website and that would be apparent to one of skill in the art in possession of the present disclosure. In an embodiment, the web server may transmit the information about the user interaction to the predictive management device 200 as the first data described above.

The method 700 proceeds to block 704 where the web server receives instructions from a predictive management device based on the interaction. In an embodiment, the web server 600 directly receives instructions from the predictive management device 200. Alternatively or additionally, the web server 600 receives instructions from the user interaction database 114. In an embodiment, the instructions may be global instructions that address general conditions on service provider system 102 that may affect a large group of users of the service provider system 102. For example, if there is a server failure on the service provider system 102 that provides services to the users, the instructions may be configured to address the server failure. In an embodiment, the instructions may be midlevel instructions that address conditions for a particular population of users. For example, there may be a condition in a specific city or region such that users in that region more likely to initiate a communication session with a customer service representative. Although the example illustrates location as a condition to provide the instructions at midlevel instructions, other conditions may be relevant in determining instructions such as age of the user, web browser type, time of day, events being provided by the service provider system 102 (e.g., a content provider is providing a pay-per-view event), and other conditions apparent to one skilled in the art.

In an embodiment, the instructions may be individual instructions that address a condition for a particular user, user account, and/or user device that is accessing the web server 600. In this embodiment, the webserver may gather an identifier of the user/user device such as user account information due to a login, and/or a device identifier of the user device 104. For example, the instructions may be based on recent activity of the user. The web server 600 may determine that a particular user logged into their account with the service provider system 102, and the web server 600 may transmit the user account information to the predictive management device 200. The predictive management device 200 may determine instructions based on the condition that is the user account information. The user account information may include recent activity of the user associated with the user account such that the recent activity as first data may be used to determine a condition exists along with an instruction based on the condition as in blocks 306 and 308 of method 300 described above. For example, the recent activity of a user account that has interacted with the website of the web server 600 and accessed the user's account may indicate that the user purchased two of the same items but in different sizes, and the items have been shipped and received by the user. The predictive management device 200 may determine that under these conditions the user is likely looking for return information for one of the items, and may generate instructions that address returning items and obtaining a refund. The predictive management device 200 may also determine that the user may be looking for exchange information to exchange one or more of the items for a different item. However, this scenario may be less likely than returning an item, which the instructions may take into account as causing the web server 600 to present the less likely scenario second to the more likely scenario, or in a less prominent area of the web page.

The method 700 proceeds to block 706 where the web server generates a customized website based on the instructions. In an embodiment, the web server 600 may generate one or more customized web pages based on the instructions received from the user interaction database 114 and/or the predictive management engine 200. The method 700 then proceeds to operation 708 where the customized website is provided for display on the user device. In an embodiment, the web server 600 may provide the customized web pages of the customized website to the user device 104, and the user device 104 may display the customized web page on a display of the user device 104.

Figure 8:
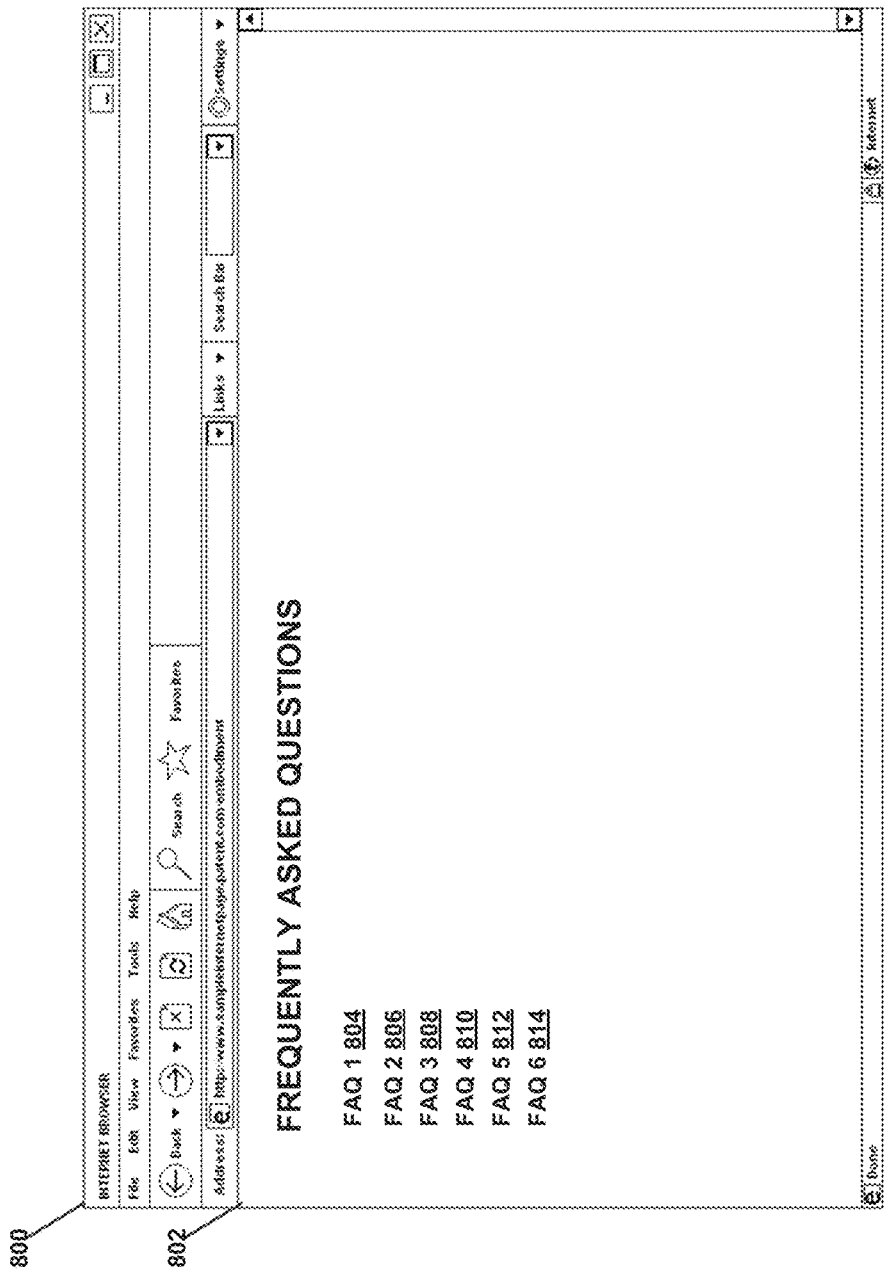
FIG. 8 is a screen shot of an embodiment of a user device displaying a customized web page at a user device.

FIG. 8 illustrates a screen shot of a specific example of how web server 600 may generate a customized web page 802 according to block 706 and block 708 of method 700 discussed above. The web server 600 may determine a user interaction with the website hosted on the web server 600 through a web browser 800 on the user device 104. The interaction may be a frequently asked questions (FAQ) web page as illustrated by web page 802 of FIG. 8. The first instruction based on the information provided about the interaction by the user may be to display links to general FAQ (e.g., top FAQ that are common for a global audience). The web server 600 may generate the web page 802 and provide the web page 802 to the user device 104 to be displayed via the web browser 800 on the display of the user device 104. For example the web page 802 may display a first FAQ link 804, a second FAQ link 806, a third FAQ link 808, a fourth FAQ link 810, a fifth FAQ link 812, and a sixth FAQ link 814. Although the example illustrates six FAQ links, it is contemplated that any number of FAQ links may be displayed, or may include any other information that the first instructions direct the web server 600 to provide to the user device 104. The FAQ links 804-814 may include a question such as "How do you retrieve forgotten account information?", "How do I create an account?", and any other FAQ that the service provider receives from users. Each FAQ link 804-814 may provide links to answers and/or directions related to the FAQ.

The method 700 proceeds to decision block 710 where the web server determines whether there is any user interaction with the customized website. In an embodiment, the web server 600 may determine whether the user is interacting with the customized website. If the user is no longer interacting or has closed out of the customized website, then the method 700 may end and the web server 600 may provide the information to the predictive management device 200. If the user interacts with the customized website, the method 700 may then proceed to block 712 where the web server transmits data associated with the interaction to the predictive management device 200. In an embodiment, the web server 600 may transmit any interactions by the user with the website hosted by the web server 600 to the predictive management device 200. The interactions may be transmitted as second data that the predictive management device 200 receives at block 312 of method 300 described above. The predictive management device 200 may determine second instructions based on the second data according to method 300, and transmit the second instructions to the user interaction database 114 or the web server 600 directly. The web server 600 may update the customized website based on the second instructions and provide the updated customized website to the user device 104 to be displayed on the display of the user device 104.

Referring again to FIG. 8, the web server 600 may monitor the user's interactions with the customized web page 802 and if the user selects a FAQ link and then becomes inactive or leaves the website, the web server 600 may report the result as second data to the predictive management device 200 and the method 700 may end. If the web server 600 detects other interactions such as the user logging into the user's account, then the web server 600 may provide this interaction and second data associated with the interaction to the predictive management server 200. The predictive management server may determine from the second data that a second condition is met and generate second instructions that are then provided directly to the web server 600 and/or to the user interaction database 114 from which the web server 600 may access those second instructions. The second instructions may include a new set of FAQ links to provide to the user that may be of particular interest to the user based on data of the user's user account. The web server 600 may update the customized web page 802 to reflect the FAQ links provided by the second instructions.

Figure 9:
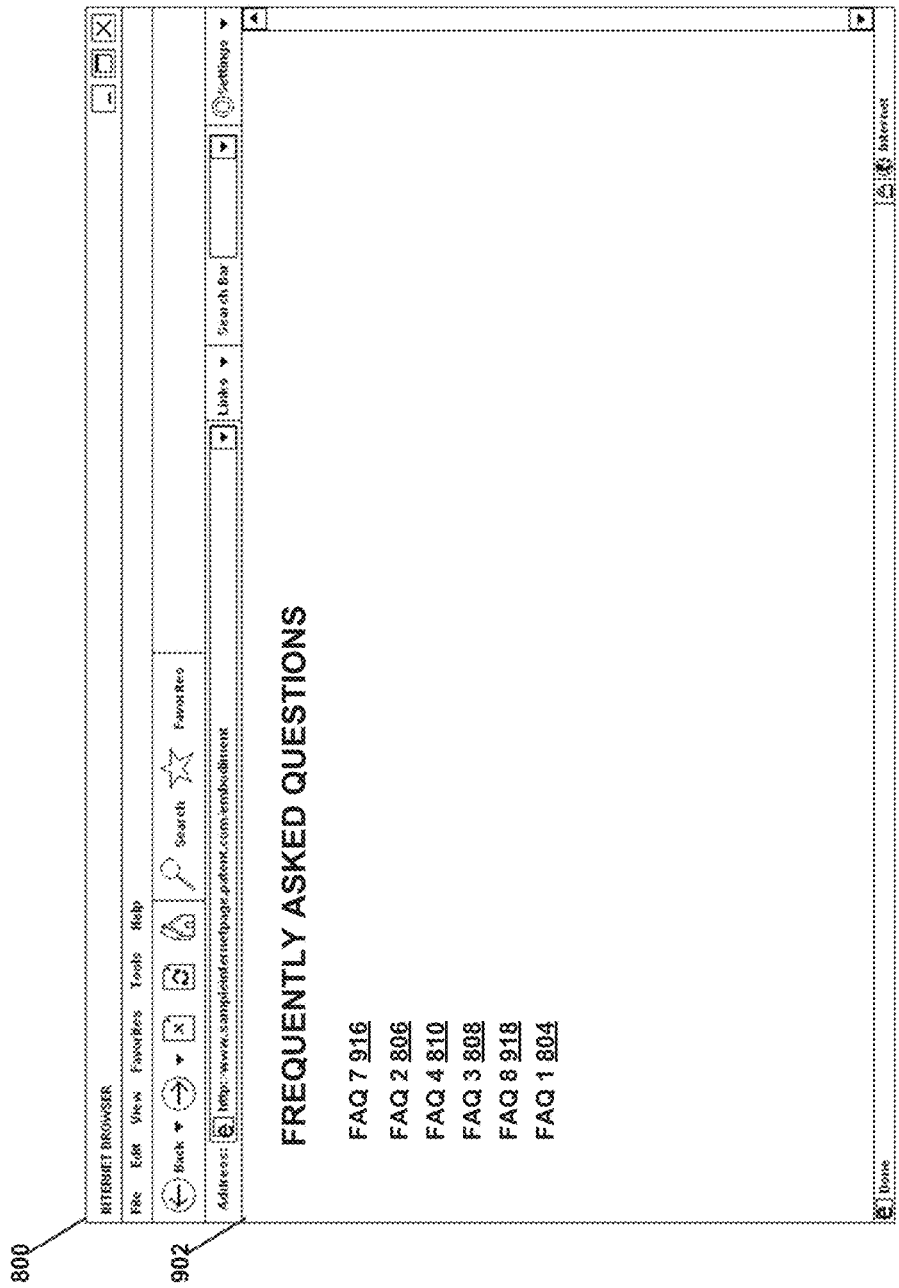
FIG. 9 is a screen shot of an embodiment of a user device displaying another customized web page at a user device.

FIG. 9 is a screen shot of an embodiment of a user device displaying an updated customized web page 902 displayed via the web browser 800 of the user device 104. Based on the information about the particular user account provided by the web server 600 to the predictive management device 200, the predictive management device 200 may determine that a seventh FAQ illustrated by FAQ link 916 is the most relevant to the particular user, and an eighth FAQ illustrated by FAQ link 918 is another relevant FAQ, both of which may take the place of FAQ links 812 and 814 of FIG. 8. For example FAQ link 812 may be a FAQ link as to retrieve forgotten account information and FAQ link 814 may be a FAQ link to establish a user account, and the predictive management device 200 may determine that those are unlikely questions of the current user since the user is logged into their user account. The predictive management device 200 may determine that a likely FAQ for the particular user, or a question that may result in a customer interaction with a customer service representative, may be "Where is my refund?" if the user has requested a refund and not received the refund within an amount of time that typically causes the user to initiate a communication session with a customer support representative about the refund. The predictive management device may generate the second instructions to cause the web server 600 to display the FAQ link related to customer refunds (e.g., the seventh FAQ link 916) at the top of the updated customized web page 902. The second instructions may prioritize other FAQ links based on the second data received. As illustrated in the updated customized web page 902, the FAQ links are ordered as the seventh FAQ link 916, the second FAQ link 806, the fourth FAQ link 810, the third FAQ link 808, the eighth FAQ link 918, and the first FAQ link 804 (e.g., in descending order of relevance.)

Figure 10:
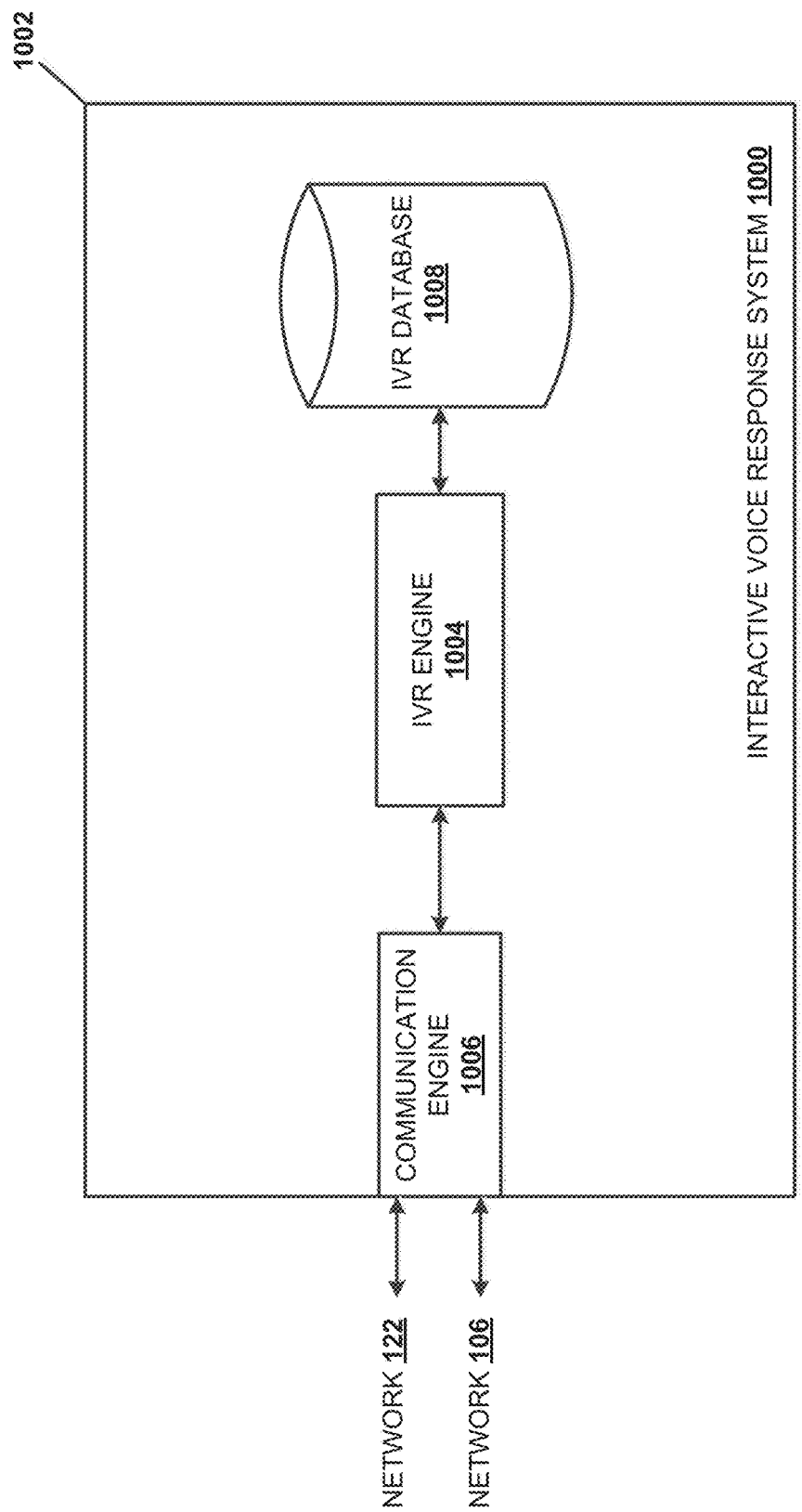
FIG. 10 is a schematic view illustrating an embodiment of an interactive voice response (IVR) system of the service provider system of FIG. 1.

Referring now to FIG. 10, an embodiment of an interactive voice response (IVR) system 1000 is illustrated. In an embodiment, the IVR system 1000 may be the IVR system 110 discussed above in FIG. 1. In the illustrated embodiment, the IVR system 1000 includes a chassis 1002 that houses the components of the IVR system 1000, only some of which are illustrated in FIG. 10. For example, the chassis 1002 may house a processing system (not illustrated) and a non-transitory memory system (not illustrated) that includes instructions that, when executed by the processing system, cause the processing system to provide an IVR engine 1004 that is configured to perform the functions of the IVR engine 1004 and/or the IVR system 1000 discussed below. In a specific example, the IVR engine 1004 may be software or instructions stored on a computer-readable medium that is configured to gather frontend data about users interacting with the IVR system 1000 (e.g., voice response interacted with, data inputted by the user, data regarding the user device 104, location of the user, identification information, acceptance rates of interactive responses, amount of time a user spends interacting with the IVR system, survey feedback from the user, if the interactive responses resolved the user's issue, and other user related data that a IVR system may gather known in the art). In a specific example, the IVR engine 1004 may be software or instructions stored on a computer-readable medium that is configured to generate and provide a customized voice response to be presented at a user device (e.g., user device 104) based on instructions generated by a predictive management device (e.g., predictive management device 200) and provide any of the other functionality that is discussed below.

The chassis 1002 may further house a communication engine 1006 that is coupled to the IVR engine 1004 (e.g., via a coupling between the communication system 1006 and the processing system) and configured to provide for communication through the network 122 and/or the network 106 as detailed below. The communication engine 1006 may be software or instructions stored on a computer-readable medium that allows the IVR system 1000 to send and receive information over the network 122 and/or the network 106. The chassis 1002 may also house an IVR database 1008 that is coupled to the IVR engine 1004 through the processing system. The IVR database 1008 may store interactive voice responses and instruction used to generate customized interactive voice response based on instructions generated and provided by the predictive management device 200. While the IVR database 1008 has been illustrated as housed in the chassis 1002 of the IVR system 1000, one of skill in the art will recognize that it may be connected to the IVR engine 1004 through the network 122 and/or network 106 without departing from the scope of the present disclosure.

Figure 11:
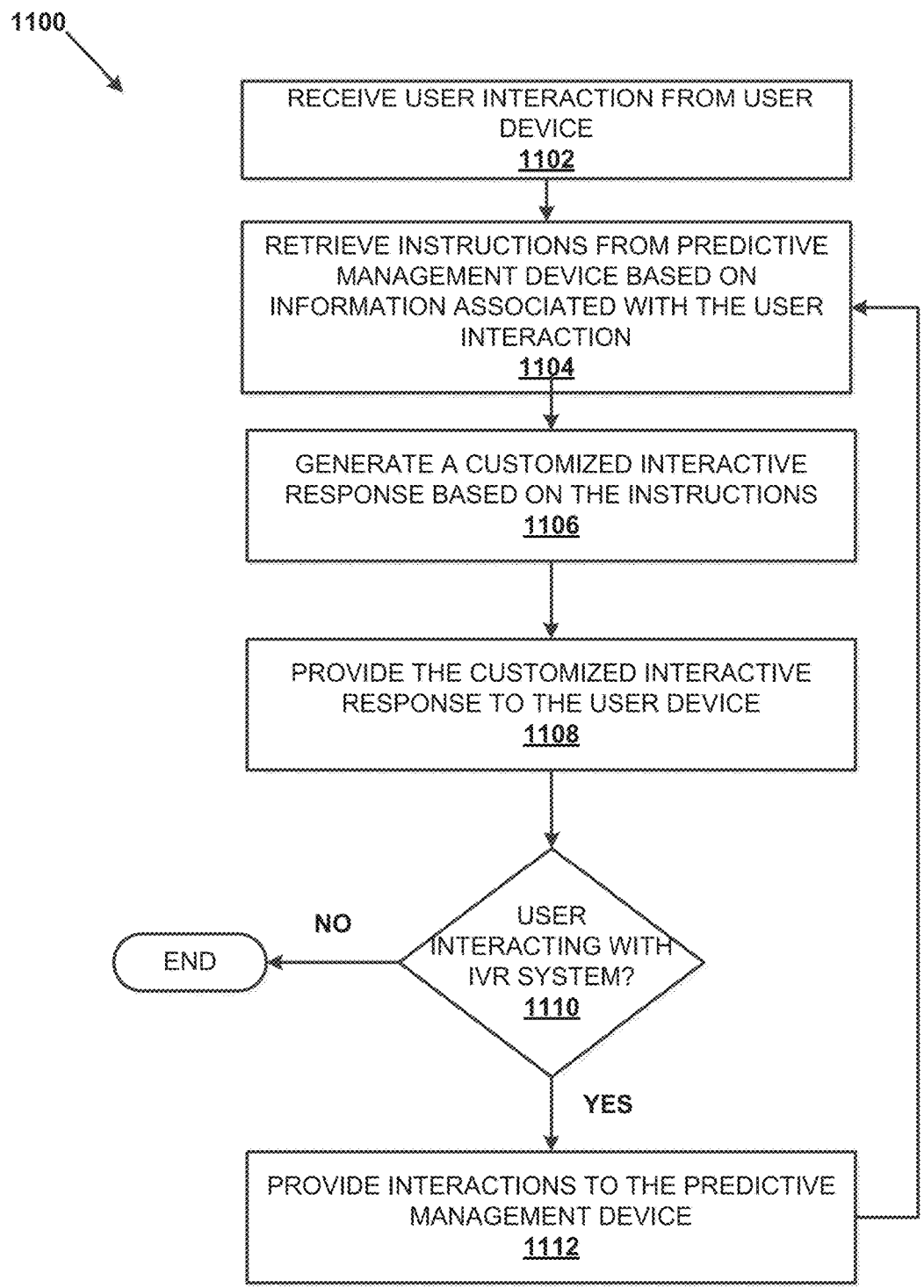
FIG. 11 is a flow chart illustrating an embodiment of a method for providing a customized interactive response to a user device.

Referring now to FIG. 11, a method 1100 for generating a customized user experience via an IVR system is illustrated. In the illustrated embodiment, one or more IVR systems may operate to perform or enable the method 1100. IVR systems typically include a voice response; however it is contemplated that other interactive response systems such as an interactive messaging response (IMR) system may fall under the scope of the disclosure with respect to method 1100. Method 1100 begins at block 1102 where an IVR system receives a user interaction from a user device. In an embodiment, the IVR system 1000 may receive a communication session request such as a telephone call, a text message, an instant message, an email, or any other type of communication session request known in the art. The IVR system 1000 may be an initial system that is reached by a user trying to establish a communication session with a customer service representative through the contact center system 112. The gateway 111 may receive a communication session request from the user device 104. The gateway 111 may be a voice gateway, a session border controller (SBC), or any media gateway that may route the communication session request to the IVR system 1000 for the user to perform self-service actions and/or to determine the appropriate queues for customer service representatives interacting with particular groups of customer service terminals 124. The IVR system 1000 may gather any information about the user interaction including user account information, location information, user device type, time of interaction, any device identifier associated with the interaction (e.g., IP address, MAC address, telephone number, and any other identifier known in the art), and any other information that one of skill in the art in possession of the present disclosure will recognize may be captured from an initial user interaction with an IVR system. The IVR system 1000 may obtain caller line identification (CLI) data from the network to help identify or authenticate the caller. Additional caller authentication data may include account number, personal information, password and biometrics (such as voice print). In an embodiment, the IVR system 1000 may transmit the information about the user interaction to the predictive management device 200 as the first data described above with respect to method 300.

The method 1100 proceeds to block 1104 where the IVR system receives instructions from a predictive management device based on the user interaction. In an embodiment, the IVR system 1000 directly receives instructions from the predictive management device 200 based on the user interaction. Alternatively or additionally, the IVR system 1000 receives instructions from the user interaction database 114 based on the user interaction. In an embodiment, the instructions may have been stored at the IVR database 1008 before the user interaction with the user was received. In an embodiment, the instructions may be global instructions that address general conditions on service provider system 102 that may affect a large group of users of the service provider system 102. For example, if there is a server failure on the service provider system 102 that provides services to the users, the instructions may be configured to address the server failure. In an embodiment, the instructions may be midlevel instructions that address conditions for a particular population of users. For example, there may be a condition in a specific city or region such that users in that region more likely to initiate an interaction with a customer service representative (e.g., the IVR system 1000 may receive instructions based on the area code from which the user device is assigned.) Although the example illustrates location as a condition to provide the instructions at midlevel instructions, other conditions may be relevant in determining instructions such as time of day, events being provided by the service provider system 102 (e.g., a content provider is providing a pay-per-view event), and other conditions apparent to one skilled in the art.

In an embodiment, the instructions may be individual instructions that address a condition for a particular user, user account, and/or user device that is interacting with the IVR system 1000. In this particular example, the IVR system 1000 may need to gather an identifier of the user/user device such as user account information, telephone number, and/or a device identifier of the user device 104. For example, the individual instructions may be based on recent activity of the user. The IVR system 1000 may determine that a particular user is interacting with the IVR system 1000 because of the telephone number associated with the user device 104 of the user matches a telephone number associated with a user account. The IVR system 1000 may transmit the user account information to the predictive management device 200. The predictive management device 200 may determine instructions based on the condition associated with information of the user account. The user account may include recent activity of the user associated with the user account such that the recent activity may be provided as first data that may be used to determine an existing condition and generate instructions based on the condition as in blocks 306 and 308 of method 300 described above. For example, the recent activity of a user account may indicate that the user has interacted with the website of the web server 600 and accessed the user's user account. The user account may indicate that the user purchased two of the same items but different sizes and the items have been shipped and received by the user. The information associated with the user's user account may also indicate that the user visited one or more FAQ links of the website that were associated with returns. The predictive management device 200 may determine that under these conditions, the user is likely looking for return information for one of the items and may generate instructions that address returning items that may or may not include information already accessed by the user at the website. The predictive management device 200 may also determine that the user may be looking for exchange information to exchange one or more of the items for a different item. However, this option may be less likely than returning an item, which the instructions may take into account. The instructions may also take into account other recent activity performed on other customer service platforms by the user. This information may be used by the predictive management device 200 to customize the instructions for the IVR system 1000 to take into account the recent website request and what information was provided to the user while the user was interacting with the website hosted on web server 600.

The method 1100 proceeds to block 1106 where the IVR system generates a customized interactive response based on the instructions. In an embodiment, the IVR system 1000 may generate a customized interactive response based on the instructions retrieved from the user interaction database 114 and/or the predictive management engine 200. The IVR system 1000 may be configured to provide prerecorded or dynamically generated audio with which the user may interact, and the IVR engine 1004 may generate the customized interactive response based on the instructions and responses stored at the IVR database 1008. The method 1100 then proceeds to block 1108 where the customized interactive response is provided to the user device. In an embodiment, the IVR system 1000 may provide the customized interactive response to the user device 104. The user device 104 may convert the customized interactive response to audio that is then provided to the user of the user device 104. In other embodiments where the customized interactive response is text based, the IVR system 1000 may generate and provide the customized interactive response to the user device 104, and the user device 104 may display the customized interactive response on a display of the user device 104.

The method 1100 proceeds to decision block 1110 where the IVR system determines whether there is any user interaction with the customized interactive response. In an embodiment, the IVR system 1000 may determine whether the user is interacting with the customized interactive response. If the user is no longer interacting or has ended the communication session, then the method 1100 may end and the IVR system 1000 may inform the predictive management device 200 that the communication session has ended. If the user interacts with the customized interactive response, then the method 1100 proceeds to block 1112 where the IVR system 1000 transmits data associated with the user interaction to the predictive management device 200. In an embodiment, the IVR system 1000 may transmit any user interaction with the IVR system 1000 to the predictive management device 200. The interactions may be transmitted as second data that the predictive management device 200 receives at block 312 of method 300 described above. The predictive management device 200 may determine second instructions based on the second data according to method 300 and transmit the second instructions to the user interaction database 114 or the IVR system 1000 directly. The IVR system 1000 may update the customized interactive response based on the second instructions, and provide an updated customized interactive response to the user device 104 for display on the display of the user device 104 and/or to produce audio on the user device 104.

Figure 12:
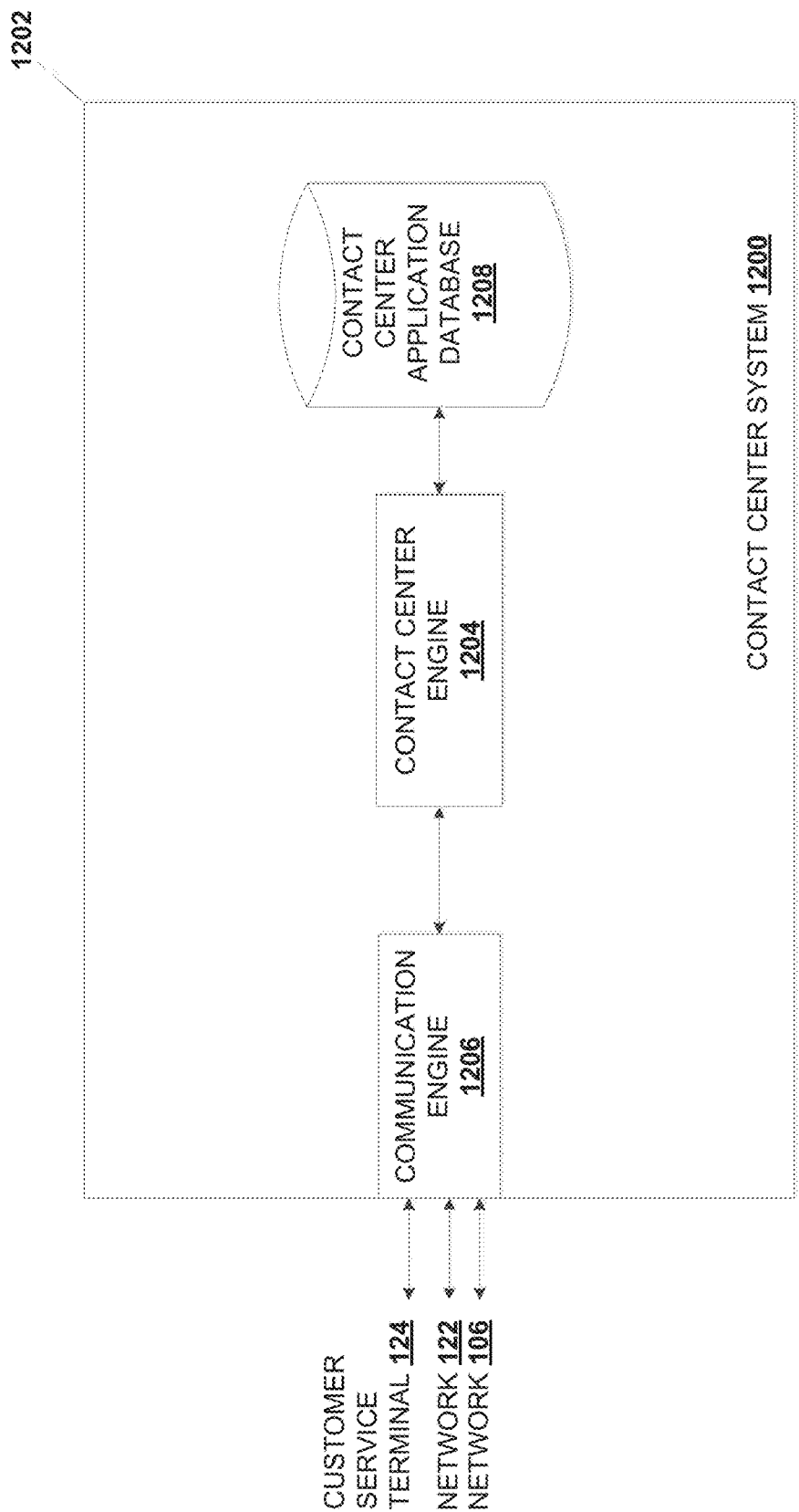
FIG. 12 is a schematic view illustrating an embodiment of a contact center system of the service provider system of FIG. 1.

Referring now to FIG. 12, an embodiment of a contact center system 1200 is illustrated. In an embodiment, the contact center system 1200 may be the contact center system 112 discussed above in FIG. 1. In the illustrated embodiment, the contact center system 1200 includes a chassis 1202 that houses the components of the contact center system 1200, only some of which are illustrated in FIG. 12. For example, the chassis 1202 may house a processing system (not illustrated) and a non-transitory memory system (not illustrated) that includes instructions that, when executed by the processing system, cause the processing system to provide an contact center engine 1204 that is configured to perform the functions of the contact center engine 1204 and/or the contact center system 1200 discussed below. In a specific example, the contact center engine 1204 may be software or instructions stored on a computer-readable medium that is configured to gather frontend data about users interacting with the contact center system 1200 and/or customer service representatives interaction with the users via the customer service terminal 124 of FIG. 1 (e.g., data inputted by the user, data regarding the user device 104, location of the user, identification information, data inputs from a customer service representative via a customer service terminal 124, customer service representative specialties, customer service representative status, display rates of suggestions provided to customer service representatives, acceptance rates of suggestions, amount of time a customer service representative spends on a user interaction, if the customer service representative opts out of a suggestion, if the user issue is resolved, and other user and/or customer service representative related data that contact center system may gather known in the art). In a specific example, the contact center engine 1204 may be software or instructions stored on a computer-readable medium that is configured to generate and provide a customized customer service terminal GUI to be presented at a customer service terminal (e.g., customer service terminal 124) based on instructions generated by a predictive management device (e.g., predictive management device 200) and provide any of the other functionality that is discussed below that one of skill in the art in possession of the present disclosure will recognize as computer functionality that may be enabled by the customer service engine 1204 as well.

The chassis 1202 may further house a communication engine 1206 that is coupled to the contact center engine 1204 (e.g., via a coupling between the communication system 1206 and the processing system) and configured to provide for communication through the network 122, the network 106, and/or directly to the customer service terminal 124 or other service provider system components as detailed below. The communication engine 1206 may be software or instructions stored on a computer-readable medium that allows the contact center system 1200 to send and receive information over the network 122 and/or the network 106. In an embodiment, the communication engine 1206 may include other contact center system 1200 components such as an Automated Call Distributor (ACD), a Private Branch Exchange (PBX), and other contact center system components for directing telephone calls and data communications to customer service representatives. The ACD may be configured interact with the IVR system 1000 for routing communication sessions from the IVR system 1000 to an appropriate customer service terminal 124 via the PBX. The ACD may be configured to interact with the gateway 111 of FIG. 1 in directing communication sessions that do not first go to the IVR system 1000, and directing communication sessions to the PBX. The ACD may be configured to interact with the web server 108 and customer account database 116 to provide any data communication sessions and/or customer account data that is associated with a user interacting with the customer service representative (e.g., via telephone) to a display of the customer service terminal 124.

The chassis 1202 may also house a contact center application database 1208 that is coupled to the contact center engine 1204 through the processing system. The contact center application database 1208 may store customer service applications for accessing and presenting user information from the user account database and instructions used to generate customized customer service terminal graphical user interfaces (GUIs) based on instructions generated and provided by the predictive management device 200. The contact center application database 1208 may also include a dashboard that houses the visual representations of suggestions that make up the customized customer service terminal GUI with which the customer service representative may interact. While the contact center 1208 has been illustrated as housed in the chassis 1202 of the contact center system 1200, one of skill in the art will recognize that it may be connected to the contact center engine 1204 through the network 122 and/or network 106 without departing from the scope of the present disclosure.

Figure 13:
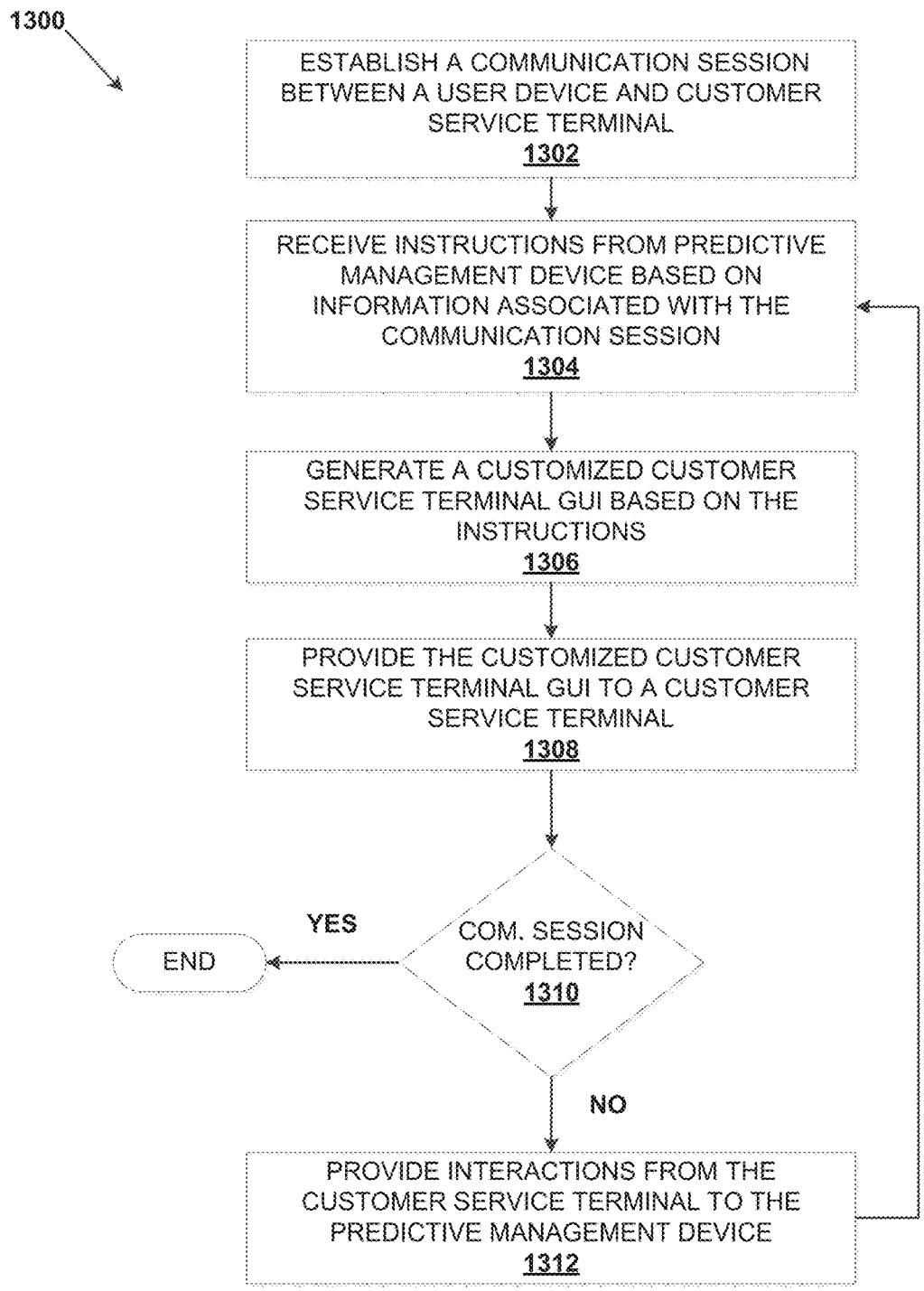
FIG. 13 is a flow chart illustrating an embodiment of a method for providing a customized customer service graphical user interface (GUI) to a customer service terminal.

Referring now to FIG. 13, a method 1300 for generating a customized customer service graphical user interface (GUI) based on instructions provided by a predictive management device is illustrated. Method 1300 begins at block 1302 where a contact center system establishes a communication session between a user device and a customer service terminal. In an embodiment, the contact center system 1200 may receive a telephone call, a text message, an instant message, an email, video, or any other type of communication session known in the art from a user device 104. The communication session may be routed through the web server 600 and/or the IVR system 1000 to the contact center system 1200. As previously described, the contact center system 1200 may include an ACD that may queue and route telephone calls or other communication sessions to appropriate customer service terminals 124 based on user selection, a user's telephone number, selected incoming line to the contact center system 1200, time of day the call was processed, and any other factors for routing calls in a contact center system 1200. The ACD may also route data associated with the user of a voice communication session to the customer service terminal 124 to be displayed through a customer service terminal GUI and/or data communication sessions from the user device 104 to the customer service terminal GUI. The communication session may be a user initiated communication session with a customer service representative as described above, and may be a communication session that the predictive management device 200 may be attempting to avoid according to a business goal of the service provider.

In an embodiment, the web server 600 and/or the IVR system 1000 may have gathered information about the initial communication session before reaching the contact center system 1200, including user account information, location information, user device type, time of interaction, any device identifier associated with the interaction (e.g., IP address, MAC address, telephone number, and any other identifier known in the art), and any other information that one of skill in the art in possession of the present disclosure would recognize may be captured from an initial communication session before the communication session with the customer service terminal was established. For example, the IVR system 1000 may obtain caller line identification (CLI) data from the network to help identify or authenticate the caller. Additional caller authentication data may include an account number, personal information, a password, and biometrics (such as voice print). Similarly, the contact center system 1200 may gather any information from a communication session request originating from the user device 104 such as originating telephone number, device identifiers, service provider, any metadata associated with the requested communication session, and any data that may be used to identifier the user of the user device 104 before the communication session is established with the customer service terminal 124. In an embodiment, the contact center system 1200 may transmit the information about the communication session request to the predictive management device 200 as the first data described above with respect to method 300.

The method 1300 proceeds to block 1304 where the contact center system receives instructions from a predictive management device based on the interaction. In an embodiment, the customer system 1200 directly receives instructions from the predictive management device 200. Alternatively or additionally, the contact center system 1200 receives instructions from the user interaction database 114. In an embodiment, the instructions may have been stored at the contact center application database 1208 before the communication session request from the user device was received. In an embodiment, the instructions may be global instructions that address general conditions on service provider system 102 that may affect a large group of users of the service provider system 102. For example, if there is a server failure on the service provider system 102 that provides services to the users, the instructions may be configured to address the server failure. In an embodiment, the instructions may be midlevel instructions that address conditions for a particular population of users. For example, there may be a condition in a specific city or region such that users in that region are more likely to initiate an interaction with a customer service representative, and the contact center system 1200 may receive instructions based on the area code from which the user device 104 is assigned. Although the example illustrates location as a condition to provide the instructions at midlevel instructions, other conditions may be relevant in determining instructions such as time of day, events being provided by the service provider system 102 (e.g., a content provider is providing a pay-per-view event), and other conditions apparent to one skilled in the art.

In an embodiment, the instructions may be individual instructions that address a condition for a particular user, user account, and/or user device that is interacting with the contact center system 1200. In this particular example, the contact center system 1200 may need to gather an identifier of the user/user device such as user account information, telephone number, and/or a device identifier of the user device 104 to provide individual instructions. For example, the individual instructions may be based on recent activity of the user. The contact center system 1200 may determine that a particular user is interacting with the contact center system 1200 because of the telephone number associated with the communication session matches a telephone number associated with a user account. The contact center system 1200 may transmit the user account information to the predictive management device 200. The predictive management device 200 may determine instructions based on a condition associated with the user account. In an embodiment, the user account may include data relating to recent activity of the user associated with the user account such that the recent activity may provide first data that is used to determine an existing condition and to generate instructions based on the condition as in blocks 306 and 308 of method 300 described above. For example, the recent activity of a user account that has interacted with the website of the web server 600 and accessed the user's account may indicate that the user purchased two of the same items with different sizes, and the items have been shipped and received by the user. The predictive management device 200 may determine that under these conditions the user is likely looking for return information for one of the items and may generate instructions that address returning items. The predictive management device 200 may also determine that the user may be looking for exchange information to exchange one or more of the items for a different item. However, this scenario may be less likely than the returning an item, which the instructions may take into account. The instructions may also take into account other recent activity performed on other contact center systems by the user. For example, the user may have recently accessed their user account on through the web server 600, or have just interacted with the IVR system 1000 prior to being routed to the contact center system 1200. This information gathered by the web server 600 and/or IVR system 1000 may be used by the predictive management device 200 to customize the instructions for the contact center system 1200 to take into account the recent website request and what information was provided to the user while the user was interacting with the website hosted on web server 600 and/or the interactive responses interactions by the user with the IVR system 1000.

The method 1300 proceeds to block 1306 where the contact center system generates a customized customer service terminal GUI based on the instructions. In an embodiment, the contact center system 1200 may generate customized customer service terminal GUI based on the instructions retrieved from the user interaction database 114 and/or the predictive management engine 200. The contact center system 1200 is configured to generate customized customer service terminal GUI based on the instructions and customer service application stored at the contact center application database 1208.

The method 1300 then proceeds to block 1308 where the customized customer service terminal GUI is provided to the customer service terminal. In an embodiment, the contact center system 1200 may provide the customized customer service terminal GUI to the customer service terminal 124. The customer service terminal 124 may display the customer service terminal GUI for the customer service representative of the customer service terminal 124. For example, the customer service terminal GUI may be displayed on a computer display of the customer service terminal while the customer service representative is actively participating in a communication session with the user of the user device 104 via the customer service terminal GUI and/or a telephone of the customer service terminal 124.

Figure 14:
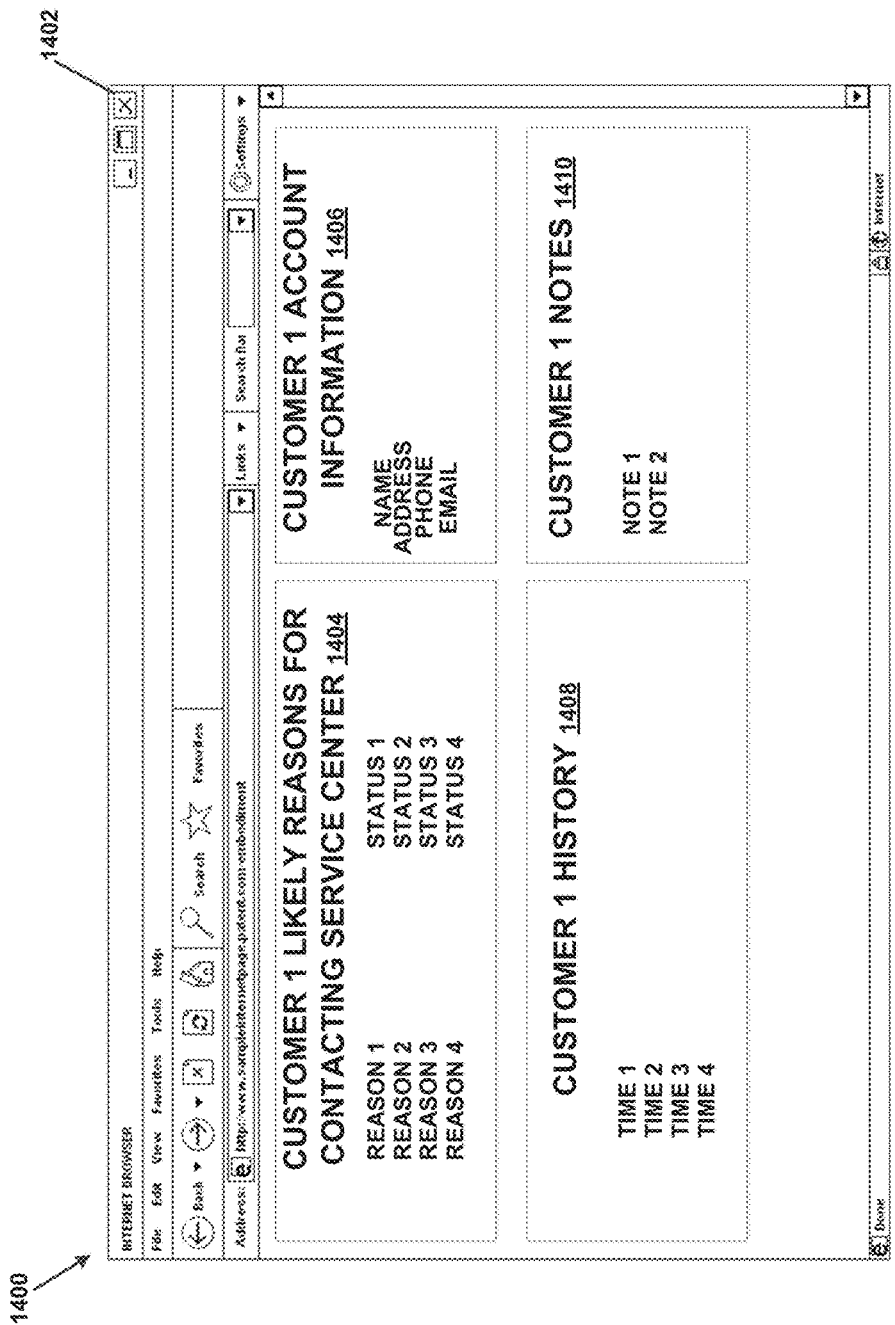
FIG. 14 is a screen shot of an embodiment of a customer service terminal displaying a customized customer service GUI.

Referring to FIG. 14, a screen shot of an embodiment of a customer service terminal displaying a customized customer service terminal GUI 1400 is illustrated. In the particular example illustrated in FIG. 14, the customized customer service terminal GUI 1400 may include one or more customer service applications. The customer service applications may be provided via a web browser 1402 or other application graphical user interface known in the art. Each application may include one or more sections (e.g., section 1404, section 1406, section 1408 and section 1410) that may include one or more editable fields and/or notification windows for instructions to be displayed or accessed. For example, the section 1404 may include a hierarchy of reasons and status of the reasons for a particular user establishing the communication session with the customer service represented based on the instructions provided by the predictive management device 200. Section 1406 of the customer service terminal GUI 1400 may include user account information of the user interacting with the customer service representative. Section 1408 may include recent history of user interactions with the service provider and/or the customer service platforms. Section 1410 may include customer notes of previous interactions with the user associated with the user account and may be configured to allow the customer service representative to insert additional notes as the customer service representative interacts with the user of the user device 104. Although simplified and specific examples of the customer service terminal GUI 1400 are illustrated, one skilled in the art will recognize that many different configurations of the customer service terminal GUI 1400 and information displayed and received through the customer service terminal GUI 1400 will fall under the scope of the present disclosure.

The method 1300 proceeds to decision block 1310 where the contact center system determines whether there is a customer service representative interaction with the customized customer service terminal GUI. In an embodiment, the contact center system 1200 may determine whether the customer service representative is interacting with the customized customer service terminal GUI. If the customer service representative is no longer interacting with the customer service terminal GUI or has ended the communication session with the user, then the method 1300 may end and the contact center system 1200 may provide the information to the predictive management device 200 that the communication session has ended. If the customer service representative interacts with the customized customer service terminal GUI, then the method 1300 proceeds to block 1312 where the contact center system 1200 transmits data associated with the customer service representative to the predictive management device 200. In an embodiment, the contact center system 1200 may transmit any customer service representative interaction with the contact center system 1200 to the predictive management device 200. The interactions may be transmitted as second data that the predictive management device 200 receives at block 312 of method 300 described above. The predictive management device 200 may determine second instructions based on the second data according to method 300, and may transmit the second instructions to the user interaction database 114 or the contact center system 1200 directly. The contact center system 1200 may then update the customized customer service terminal GUI based on the second instructions, and provide the updated customized customer service terminal GUI to the customer service terminal 124 to be displayed on the display of the customer service terminal 124 and/or to produce audio on the customer service terminal 124.

Figure 15:
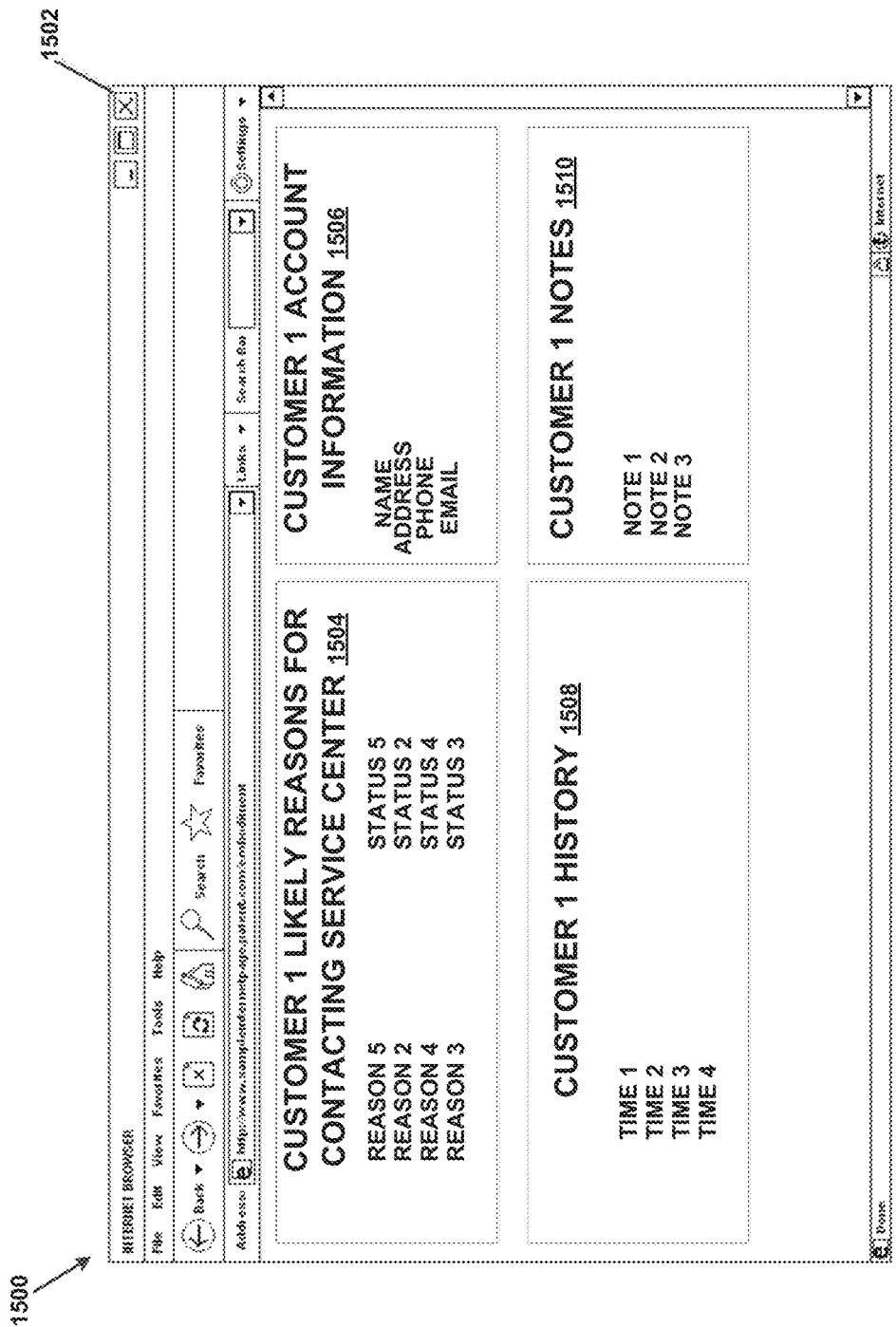
FIG. 15 is a screen shot of an embodiment of a customer service terminal displaying another customized customer service GUI.

Referring to FIG. 15, a screen shot of an embodiment of a customer service terminal displaying an updated customized customer service terminal GUI 1500 is illustrated. In the particular example illustrated in FIG. 15, the updated customized customer service terminal GUI 1500 may include one or more customer service applications that have been updated based on second instructions generated and provided by the predictive management device 200. The customer service applications may be provided via a web browser 1502 or other application graphical user interface known in the art. The application may include one or more updated sections based on the customer service representative interactions provided by the customer service representative with the customer service terminal (e.g., updated section 1504, section 1506, section 1508 and section 1510). For example, updated section 1504 may include an updated hierarchy of reasons, and a status for each reason for a particular user establishing the communication session with the customer service represented. For example, after a first reason of section 1404 was determined not to be the reason for a particular user establishing the communication session, the predictive management device may have determined that a fifth reason is the most likely reason for the communication session. Updated section 1506 of the customer service terminal GUI 1500 may include updated user account information of the user interacting with the customer service representative. Updated section 1508 may include recent history of user interactions with the service provider and/or the customer service platforms such as the customer service representative interaction that resulted in the updated customer service terminal GUI 1500. Updated section 1510 may include updated customer notes including the previous interaction with the user that caused the predictive management device 200 to update the customer service terminal GUI 1500. Although simplified and specific examples of the updated customer service terminal GUI 1500 are illustrated, one skilled in the art in possession of the present disclosure will recognize that many different configurations of the updated customer service terminal GUI 1500 and information displayed and received through the updated customer service terminal GUI 1500 will fall within the scope of the present disclosure.

Thus, a system and method for a cross-platform customer service system has been described that may predict possible user interactions with a service provider system based on real-time and historical data that is processed by machine learning algorithms. Based on the predicted user interactions, the cross-platform customer service system may pre-emptively provide information to a user and/or perform actions to generate and provide a customized user experience that may help achieve a business goal of the service provider. The cross-platform customer service system may provide instructions to multiple customer service platforms based on data gathered from one of the customer service platforms, as well as a backend monitoring system that gathers data about the service provider system so that any one of the customer service platforms may have real-time information and instructions to provide the customized user experience.

Figure 16:
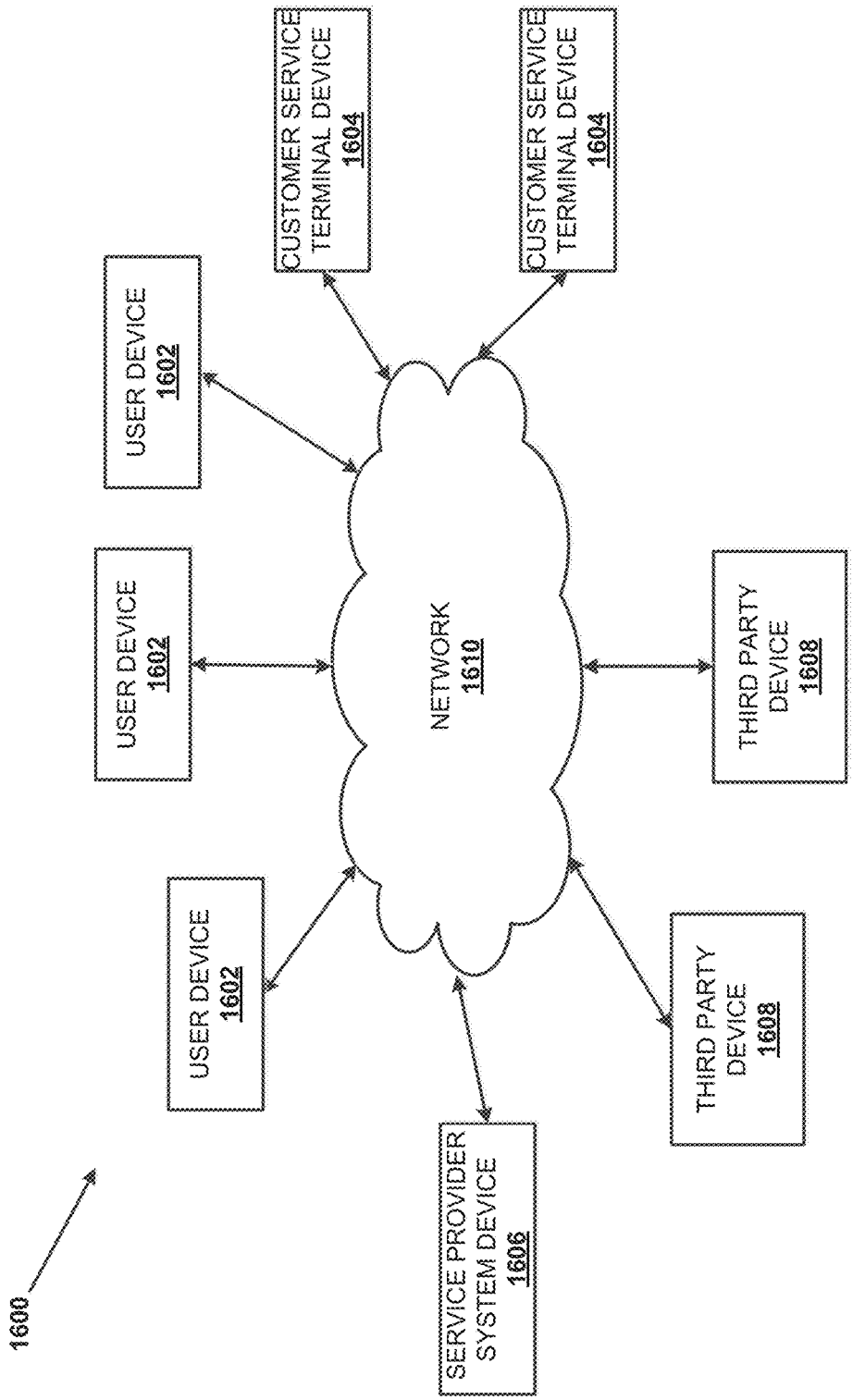
FIG. 16 is a schematic view illustrating an embodiment of a networked system.

Referring now to FIG. 16, an embodiment of a network-based system 1600 for implementing one or more processes described herein is illustrated. As shown, network-based system 1600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 16 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1600 illustrated in FIG. 16 includes a plurality of user devices 1602, a plurality customer service terminals 1604, a service provider system device 1606, and a plurality third party devices 1608 in communication over a network 610. Any of the user devices 1602 may be the payer device 104, discussed above. The customer service terminals 1604 may be the customer service terminals 124 discussed above and may be operated by the customer service representatives discussed above. The service provider system device 1606 may be the service provider system 102 including the devices discussed above and may be operated by a payment service provider such as, for example, PayPal Inc. of San Jose, Calif. The third party devices 1608 may be the third party databases 126 discussed above and operated by data brokers.

The user device 1602, the customer service terminal device 1604, the service provider system device 1606, and the third party device 1608 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1600, and/or accessible over the network 1610.

The network 1610 may be implemented as a single network or a combination of multiple networks. For example, in various embodiments, the network 1610 may include the Internet and/or one or more intranets, landline networks, wireless networks, and/or other appropriate types of networks.

The user device 1602 may be implemented using any appropriate combination of hardware and/or software configured for wired and/or wireless communication over network 1610. For example, in one embodiment, the user device 1602 may be implemented as a personal computer of a user in communication with the Internet. In other embodiments, the user device 1602 may be a smart phone, personal digital assistant (PDA), laptop computer, and/or other types of computing devices.

The user device 1602 may include one or more browser applications which may be used, for example, to provide a convenient interface to permit the user to browse information available over the network 610. For example, in one embodiment, the browser application may be implemented as a web browser configured to view information available over the Internet.

The user device 1602 may also include one or more toolbar applications which may be used, for example, to provide user-side processing for performing desired tasks in response to operations selected by the user. In one embodiment, the toolbar application may display a user interface in connection with the browser application.

The user device 1602 may further include other applications as may be desired in particular embodiments to provide desired features to the user device 1602. In particular, the other applications may include a payment application for payments assisted by a payment service provider through the service provider system device 1606. The other applications may also include security applications for implementing user-side security features, programmatic user applications for interfacing with appropriate application programming interfaces (APIs) over the network 1610, or other types of applications. Email and/or text applications may also be included, which allow the user to send and receive emails and/or text messages through the network 1610. The user device 1602 includes one or more user and/or device identifiers which may be implemented, for example, as operating system registry entries, cookies associated with the browser application, identifiers associated with hardware of the user device 1602, or other appropriate identifiers, such as a phone number. In one embodiment, the user identifier may be used by the service provider system device 1606 and/or the customer service terminal device 1604 to associate the user with a particular account as further described herein.

Figure 17:
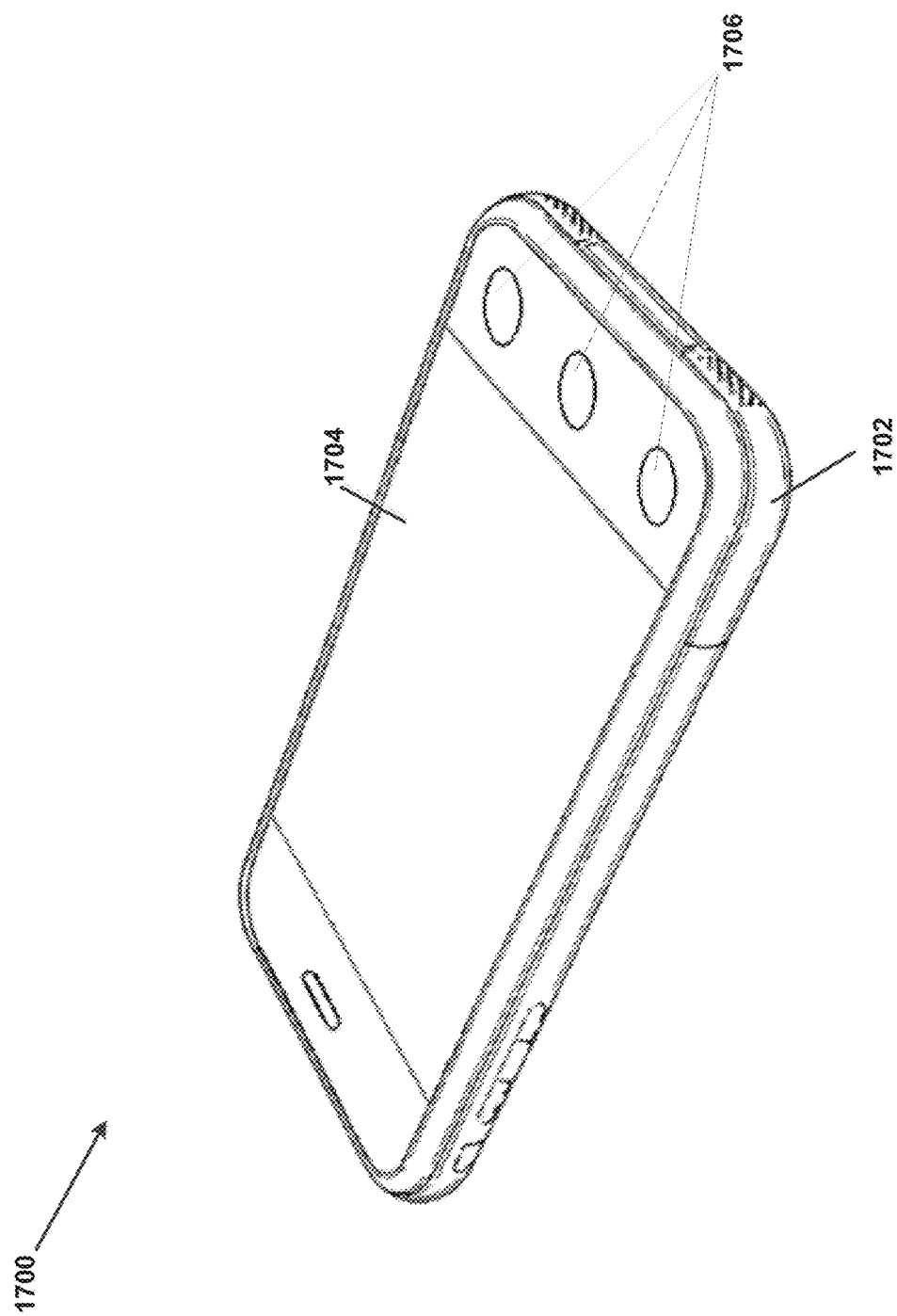
FIG. 17 is a perspective view illustrating an embodiment of a user device.

Referring now to FIG. 17, an embodiment of a user device 1700 is illustrated. The device 1700 may be any of the user devices discussed above. The user device 1700 includes a chassis 1702 having a display 1704 and an input device including the display 1704 and a plurality of input buttons 1706. One of skill in the art will recognize that the user device 1700 is a portable or mobile phone including a touch screen input device and a plurality of input buttons that allow the functionality discussed above with reference to the methods 300, 500, 700, 1100, and 1300. However, a variety of other portable/mobile devices and/or desktop devices may be used in the method 100 without departing from the scope of the present disclosure.

Referring now to FIG. 18, an embodiment of a computer system 1800 suitable for implementing, for example, the user devices, the customer service terminals, the service provide system, and third party databases, is illustrated. It should be appreciated that other devices utilized service provider system discussed above may be implemented as the computer system 1800 in a manner as follows:

In accordance with various embodiments of the present disclosure, computer system 1800, such as a computer and/or a network server, includes a bus 1802 or other communication mechanism for communicating information, which interconnects subsystems and components, such as a processing component 804 (e.g., processor, micro-controller, digital signal processor (DSP), etc.), a system memory component 1806 (e.g., RAM), a static storage component 1808 (e.g., ROM), a disk drive component 1810 (e.g., magnetic or optical), a network interface component 1812 (e.g., modem or Ethernet card), a display component 1814 (e.g., CRT or LCD), an input component 1818 (e.g., keyboard, keypad, or virtual keyboard), a cursor control component 1820 (e.g., mouse, pointer, or trackball), and/or a location determination component 1822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 1800 performs specific operations by the processor 1804 executing one or more sequences of instructions contained in the memory component 1806, such as described herein with respect to the user devices, the customer service terminals, the service provide system, and/or the third party databases. Such instructions may be read into the system memory component 1806 from another computer readable medium, such as the static storage component 1808 or the disk drive component 1810. In other embodiments, hard-wired circuitry may be used in place of or in combination with software instructions to implement the present disclosure.

Logic may be encoded in a computer readable medium, which may refer to any medium that participates in providing instructions to the processor 1804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1810, volatile media includes dynamic memory, such as the system memory component 1806, and transmission media includes coaxial cables, copper wire, and fiber optics, including wires that comprise the bus 1802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1800. In various other embodiments of the present disclosure, a plurality of the computer systems 800 coupled by a communication link 1824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1800 may transmit and receive messages, data, information and instructions, including one or more programs (i.e., application code) through the communication link 1824 and the network interface component 1812. The network interface component 1812 may include an antenna, either separate or integrated, to enable transmission and reception via the communication link 1824. Received program code may be executed by processor 1804 as received and/or stored in disk drive component 1810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a predictive management server coupled, via a network, to a service provider system that includes a plurality of customer service platforms, wherein the predictive management server comprises:
a non-transitory memory; and
one or more hardware processors coupled to the non-transitory memory and configured to read instructions from the non-transitory memory to cause the system to perform operations comprising:
receiving, via the network, first data about the service provider system that includes the plurality of customer service platforms;
determining first user interaction rules based on the first data received about the service provider system;
determining a first condition exists in the service provider system based on the first data received and the first user interaction rules;
determining first instructions for the service provider system based on the first condition, wherein the first instructions include actions to achieve a customized user response based on the first condition;
providing, via the network, the first instructions for the service provider system such that the plurality of customer service platforms of the service provider system have access to the first instructions;
receiving second data of a user interaction with at least one customer service platform of the plurality of customer service platforms when the first instructions have been executed; and
updating the first instructions to second instructions based on the second data received as a result of the user interaction, wherein the first instructions and the second instructions are configured to direct the user interaction to a first customer service platform of the plurality of customer service platforms over a second customer service platform of the plurality of customer service platforms.

2. The system of claim 1, wherein the updating the first instructions to second instructions based on the second data received as the result of the user interaction includes updating the first instructions to second instructions based on the second data when the customized user response was not achieved.

3. The system of claim 1, wherein the first data received about the service provider system to determine first user interaction rules includes historical data of at least one of service provider system conditions, user account conditions, or user interactions that resulted in a particular user action.

4. The system of claim 1, wherein the operations further comprise:
updating first user interaction rules to second user interaction rules based on the second data received;
determining a second condition exists in the service provider system based on the second data received and the second user interaction rules, wherein the updating of the first instructions to the second instructions based on the second data received as a result of the user interaction includes determining second instructions for the service provider system based on the second condition and the second user interaction rules, wherein the second instructions include actions to achieve the customized user response based on the second condition; and
providing the second instructions for the service provider system such that the plurality of customer service platforms have access to the second instructions.

5. The system of claim 1, wherein the first instructions when accessed by a web server of the plurality of customer service platforms from a customer interaction database cause the web server to generate and provide a customized website to be displayed on a user device accessing the web server, wherein the first instructions are based on first data that includes data associated with the user device.

6. The system of claim 1, wherein the first instructions when accessed by an interactive voice response (IVR) system of the plurality of customer service platforms generate and provide a customized interactive response to a user device based on the first instructions, wherein the first instructions are based on first data that includes data associated with the user device.

7. The system of claim 1, wherein the first instructions when accessed by a contact center system generate and provide a customized customer service terminal graphical user interface to a customer service terminal.

8. A method for predictive cross-platform customer service, comprising:
receiving, by a predictive management server via a network, first data about a service provider system that includes a plurality of customer service platforms;
determining, by the predictive management server, first user interaction rules based on the first data received about the service provider system;
determining, by the predictive management server, a first condition exists in the service provider system based on the first data received and the first user interaction rules;
determining, by the predictive management server, first instructions for the service provider system based on the first condition, wherein the first instructions include actions to achieve a customized user response based on the first condition;

providing, by the predictive management server via the network, the first instructions for the service provider system such that the plurality of customer service platforms of the service provider system have access to the first instructions;

receiving, by the predictive management server via the network, second data of a user interaction with at least one customer service platform of the plurality of customer service platforms when the first instructions have been executed; and updating, by the predictive management server, the first instructions to second instructions based on the second data received as a result of the user interaction, wherein the first instructions and the second instructions are configured to direct the user interaction to a first customer service platform of the plurality of customer service platforms over a second customer service platform of the plurality of customer service platforms.

9. The method of claim 8, wherein the updating the first instructions to second instructions based on the second data received as the result of the user interaction includes updating the first instructions to second instructions based on the second data when the customized user response was not achieved.

10. The method of claim 8, wherein the first data received about the service provider system to determine first user interaction rules includes historical data of at least one of service provider system conditions, user account conditions, or user interactions that resulted in a particular user action.

11. The method of claim 8, further comprising:
updating first user interaction rules to second user interaction rules based on the second data received;
determining a second condition exists in the service provider system based on the second data received and the second user interaction rules, wherein the updating of the first instructions to the second instructions based on the second data received as a result of the user interaction includes determining second instructions for the service provider system based on the second condition and the second user interaction rules, wherein the second instructions include actions to achieve the customized user response based on the second condition; and
providing the second instructions for the service provider system such that the plurality of customer service platforms have access to the second instructions.

12. The method of claim 8, wherein the first instructions when accessed by a web server of the plurality of customer service platforms from a customer interaction database cause the web server to generate and provide a customized website to be displayed on a user device accessing the web server, wherein the first instructions are based on first data that includes data associated with the user device.

13. The method of claim 8, wherein the first instructions when accessed by an interactive voice response (IVR) system of the plurality of customer service platforms generate and provide a customized interactive response to a user device based on the first instructions, wherein the first instructions are based on first data that includes data associated with the user device.

14. The method of claim 8, wherein the first instructions when accessed by a contact center system generate and provide a customized customer service terminal graphical user interface to a customer service terminal.

15. A non-transitory machine-readable medium having stored thereon machine-readable instructions executable to cause a machine to perform operations comprising:

receiving, by a predictive management server via a network, first data about a service provider system that includes a plurality of customer service platforms;

determining first user interaction rules based on the first data received about the service provider system;

determining a first condition exists in the service provider system based on the first data received and the first user interaction rules;

determining first instructions for the service provider system based on the first condition, wherein the first instructions include actions to achieve a customized user response based on the first condition;

providing, by the predictive management server via the network, the first instructions for the service provider system such that the plurality of customer service platforms of the service provider system have access to the first instructions;

receiving, by the predictive management server via the network, second data of a user interaction with at least one customer service platform of the plurality of customer service platforms when the first instructions have been executed; and updating the first instructions to second instructions based on the second data received as a result of the user interaction, wherein the first instructions and the second instructions are configured to direct the user interaction to a first customer service platform of the plurality of customer service platforms over a second customer service platform of the plurality of customer service platforms.

16. The non-transitory machine-readable medium of claim 15, wherein the updating the first instructions to second instructions based on the second data received as the result of the user interaction includes updating the first instructions to second instructions based on the second data when the customized user response was not achieved.

17. The non-transitory machine-readable medium of claim 15, wherein the operations further comprise:
updating first user interaction rules to second user interaction rules based on the second data received;
determining a second condition exists in the service provider system based on the second data received and the second user interaction rules, wherein the updating of the first instructions to the second instructions based on the second data received as a result of the user interaction includes determining second instructions for the service provider system based on the second condition and the second user interaction rules, wherein the second instructions include actions to achieve the customized user response based on the second condition; and
providing the second instructions for the service provider system such that the plurality of customer service platforms have access to the second instructions.

18. The non-transitory machine-readable medium of claim 15, wherein the first instructions when accessed by a web server of the plurality of customer service platforms from a customer interaction database cause the web server to generate and provide a customized website to be displayed on a user device accessing the web server, wherein the first instructions are based on first data that includes data associated with the user device.

19. The non-transitory machine-readable medium of claim 15, wherein the first instructions when accessed by an interactive voice response (IVR) system of the plurality of customer service platforms generate and provide a customized interactive response to a user device based on the first instructions, wherein the first instructions are based on first data that includes data associated with the user device.

20. The non-transitory machine-readable medium of claim 15, wherein the first instructions when accessed by a contact center system generate and provide a customized customer service terminal graphical user interface to a customer service terminal.

\* \* \* \* \*